(12) United States Patent
Suzuki et al.

(10) Patent No.: US 7,782,506 B2
(45) Date of Patent: *Aug. 24, 2010

(54) IMAGE READING APPARATUS CAPABLE OF DETECTING NOISE

(75) Inventors: Hiroyuki Suzuki, Toyokawa (JP);
Kazuhiro Ishiguro, Toyohashi (JP);
Hideyuki Toriyama, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 960 days.

This patent is subject to a terminal disclaimer.

(21) Appl. No.: 11/020,232

(22) Filed: Dec. 27, 2004

(65) Prior Publication Data

US 2006/0098248 A1 May 11, 2006

(30) Foreign Application Priority Data

Nov. 10, 2004 (JP) .............................. 2004-326869

(51) Int. Cl.
*H04N 1/46* (2006.01)
*H04N 1/38* (2006.01)

(52) U.S. Cl. ...................................... 358/514; 358/463

(58) Field of Classification Search ................. 358/463; 382/165, 275
See application file for complete search history.

(56) References Cited

U.S. PATENT DOCUMENTS

| 4,980,760 A | 12/1990 | Hiratsuka et al. |
| 5,317,420 A * | 5/1994 | Kuwahara .................... 358/463 |
| 5,850,293 A | 12/1998 | Suzuki et al. |
| 5,982,946 A | 11/1999 | Murakami |
| 6,125,213 A | 9/2000 | Morimoto |
| 6,215,512 B1 | 4/2001 | Imaizumi et al. |
| 6,323,959 B1 | 11/2001 | Toyama et al. |
| 6,441,915 B1 | 8/2002 | Imaizumi et al. |
| 6,625,331 B1 | 9/2003 | Imaizumi et al. |

(Continued)

FOREIGN PATENT DOCUMENTS

EP 0270090 9/1993

(Continued)

OTHER PUBLICATIONS

U.S. Appl. No. 11/012,184, filed Dec. 16, 2004, Ishiguro et al.

(Continued)

*Primary Examiner*—Douglas Q Tran
(74) *Attorney, Agent, or Firm*—Morrison & Foerster LLP

(57) ABSTRACT

An image reading apparatus includes, with the purpose of detecting with improved precision noise generated due to dust on a platen, three line sensors spaced from each other in a sub scanning direction to scan an original in the sub scanning direction, the platen between the original and the three line sensors, a moving mechanism for moving the platen at a rate relative to the line sensors, the rate being different from that of the original relative to the line sensors, an interline corrector synchronizing three data output from the three line sensors to be values of pixels reading a single location on the original, and a noise detector receiving these data synchronized by the interline corrector that are provided successively line by line, and the noise detector includes an isolated noise determiner determining that an isolated point of a chromatic color is a noise pixel.

11 Claims, 20 Drawing Sheets

U.S. PATENT DOCUMENTS

| | | | |
|---|---|---|---|
| 6,631,207 | B2 | 10/2003 | Hirota et al. |
| 6,728,418 | B1 | 4/2004 | Kumagai et al. |
| 6,778,297 | B1 | 8/2004 | Fujiwara |
| 6,806,902 | B1 | 10/2004 | Donovan |
| 7,046,861 | B2 | 5/2006 | Imaizumi et al. |
| 7,072,075 | B2 * | 7/2006 | Kondo et al. ............ 358/1.9 |
| 7,079,685 | B1 | 7/2006 | Hirota et al. |
| 7,283,164 | B2 | 10/2007 | Kakarala et al. |
| 7,382,406 | B2 | 6/2008 | Higuchi |
| 2001/0026380 | A1 * | 10/2001 | Imoto ..................... 358/496 |
| 2002/0136463 | A1 * | 9/2002 | Akahori et al. ........... 382/260 |
| 2006/0066915 | A1 | 3/2006 | Saka et al. |
| 2006/0066916 | A1 | 3/2006 | Ishiguro et al. |
| 2006/0066917 | A1 | 3/2006 | Ishiguro et al. |
| 2006/0066918 | A1 | 3/2006 | Ishiguro et al. |
| 2006/0066919 | A1 | 3/2006 | Saka et al. |
| 2006/0066920 | A1 | 3/2006 | Saka et al. |
| 2006/0066921 | A1 | 3/2006 | Saka et al. |
| 2006/0072169 | A1 | 4/2006 | Ishiguro et al. |
| 2006/0072826 | A1 | 4/2006 | Ishiguro et al. |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 | 5/1997 |
| JP | 10-228536 | 8/1998 |
| JP | 11-266373 | 9/1999 |
| JP | 2000-278485 | 10/2000 |
| JP | 2000-287031 A | 10/2000 |
| JP | 2000-324312 | 11/2000 |
| JP | 2001-103249 | 4/2001 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/017,662, filed Dec. 22, 2004, Ishiguro et al.
U.S. Appl. No. 11/019,712, filed Dec. 23, 2004, Saka et al.
U.S. Appl. No. 11/020,209, filed Dec. 27, 2004, Saka et al.
U.S. Appl. No. 11/020,233, filed Dec. 27, 2004, Saka et al.
U.S. Appl. No. 11/020,479, filed Dec. 27, 2004, Saka et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869; 4 pages.
Ishiguro et al., U.S. Office Action, mailed Sep. 18, 2008, directed to U.S. Appl. No. 11/012,184; 26 pages.
Ishiguro et al., U.S. Office Action, mailed Apr. 10, 2009, directed to U.S. Appl. No. 11/012,184; 15 pages.
Ishiguro et al., U.S. Office Action, mailed May 12, 2008, directed to U.S. Appl. No. 11/012,231; 37 pages.
Ishiguro et al., U.S. Office Action, mailed Nov. 20, 2008, directed to U.S. Appl. No. 11/012,231; 31 pages.
Ishiguro et al., U.S. Office Action, mailed Oct. 25, 2007, directed to U.S. Appl. No. 11/019,520; 11 pages.
Ishiguro et al., U.S. Office Action, mailed Sep. 12, 2008, directed to U.S. Appl. No. 11/017,662; 31 pages.
Ishiguro et al., U.S. Office Action, mailed Apr. 24, 2009, directed to U.S. Appl. No. 11/017,662; 27 pages.
Ishiguro et al., U.S. Office Action, mailed Sep. 23, 2008, directed to U.S. Appl. No. 11/019,181; 26 pages.
Ishiguro et al., U.S. Office Action, mailed Apr. 13, 2009, directed to U.S. Appl. No. 11/019,181; 16 pages.
Saka et al., U.S. Office Action, mailed May 22, 2008, directed to U.S. Appl. No. 11/019,712; 34 pages.
Saka et al., U.S. Office Action, mailed Nov. 10, 2008, directed to U.S. Appl. No. 11/019,712; 40 pages.
Saka et al., U.S. Office Action, mailed Apr. 22, 2009, directed to U.S. Appl. No. 11/019,712; 29 pages.
Saka et al., U.S. Office Action, mailed Jul. 3, 2008, directed to U.S. Appl. No. 11/020,209; 39 pages.
Saka et al., U.S. Office Action, mailed Jan. 27, 2009, directed to U.S. Appl. No. 11/020,209; 31 pages.
Saka et al., U.S. Office Action, mailed Jul. 2, 2008, directed to U.S. Appl. No. 11/020,479; 37 pages.
Saka et al., U.S. Office Action, mailed Jan. 22, 2009, directed to U.S. Appl. No. 11/020,479; 32 pages.
Saka et al., U.S. Office Action, mailed May 14, 2009, directed to U.S. Appl. No. 11/020,479; 35 pages.
Saka et al., U.S. Office Action, mailed Jun. 29, 2009, directed to U.S. Appl. No. 11/020,209; 31 pages.
Ishiguro et al., U.S. Office Action, mailed Jun. 26, 2009, directed to U.S. Appl. No. 11/012,231; 8 pages.
Saka et al., U.S. Office Action, mailed Jan. 26, 2010, directed to U.S. Appl. No. 11/020,479; 4 pages.

* cited by examiner

F I G. 1
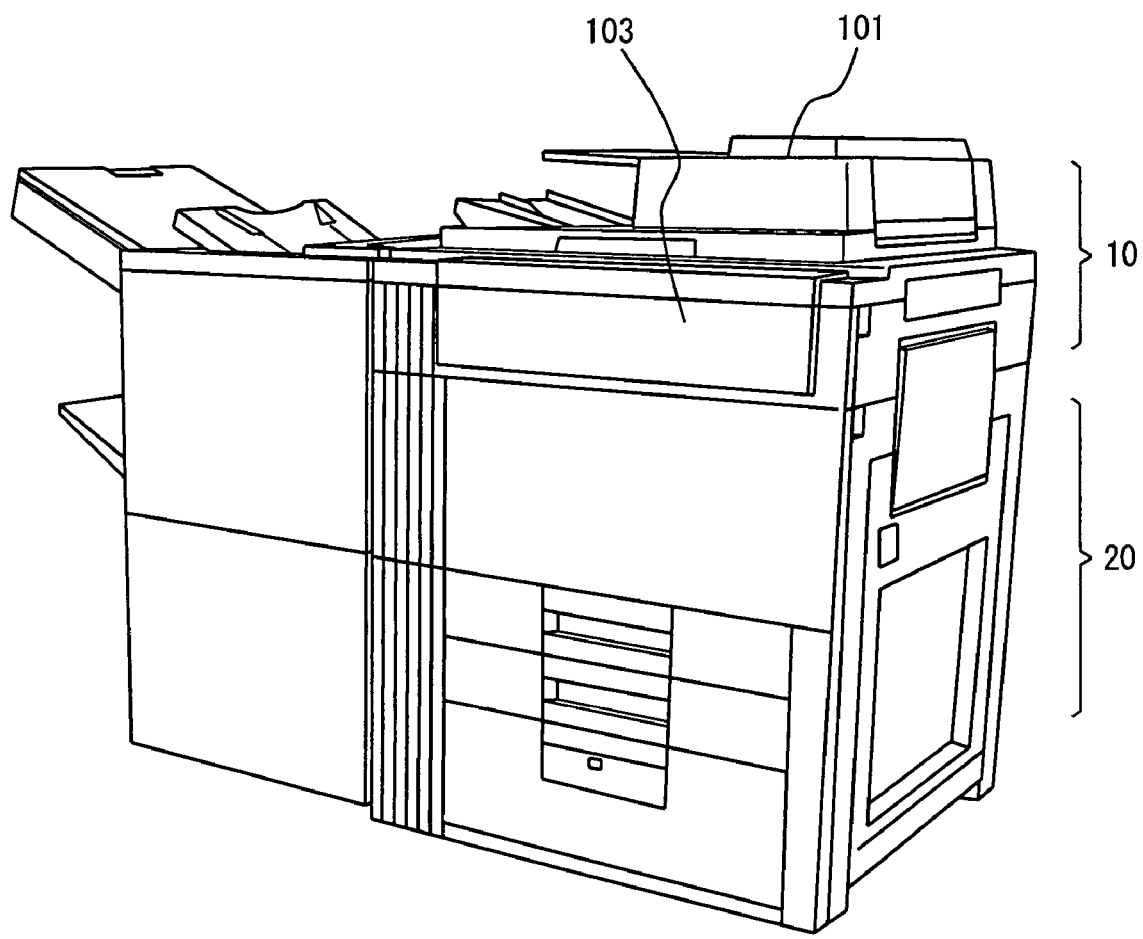

F I G. 3
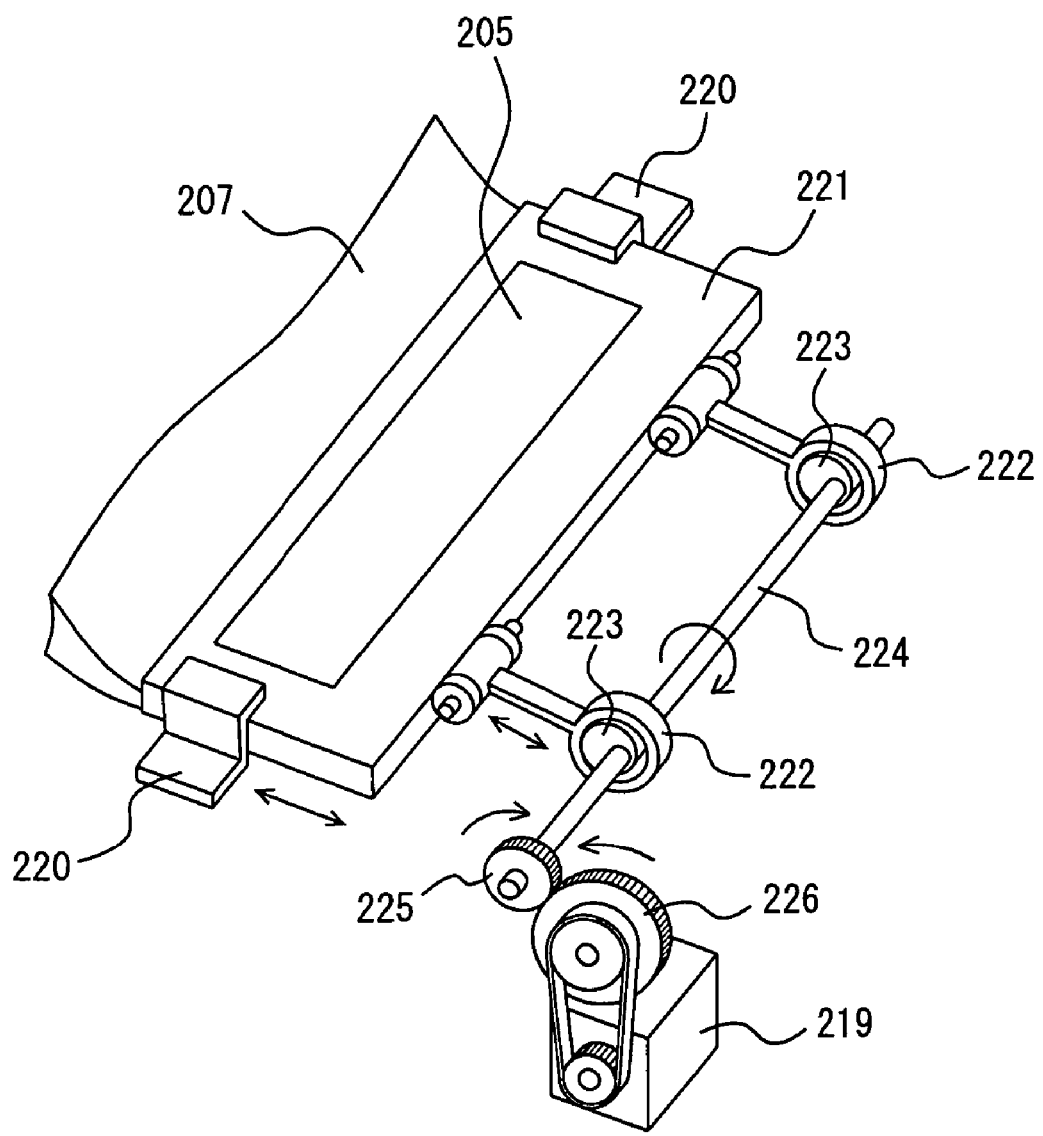

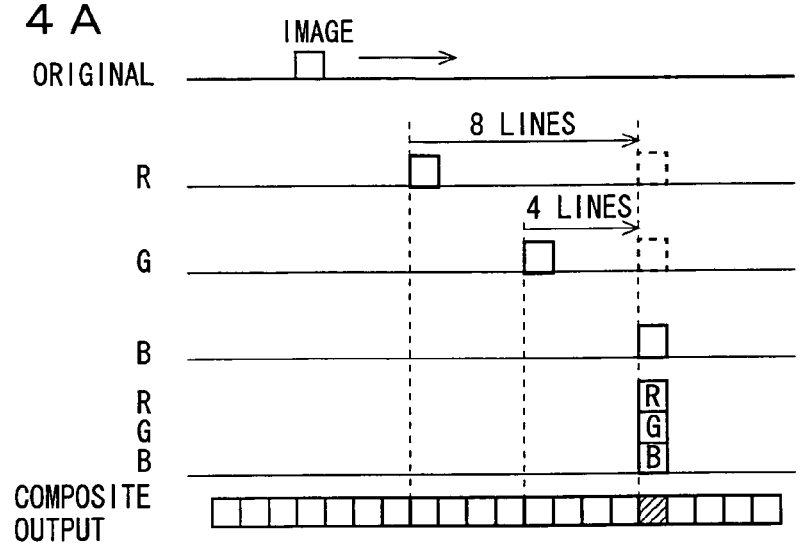
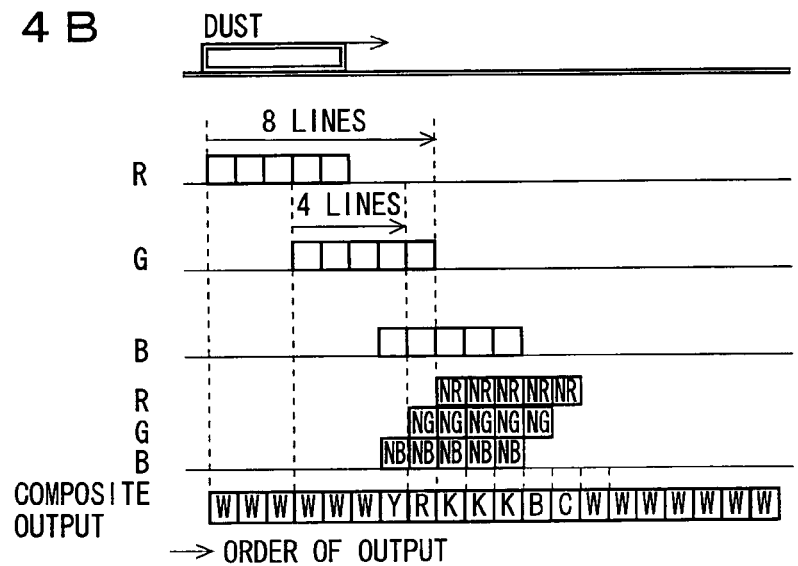
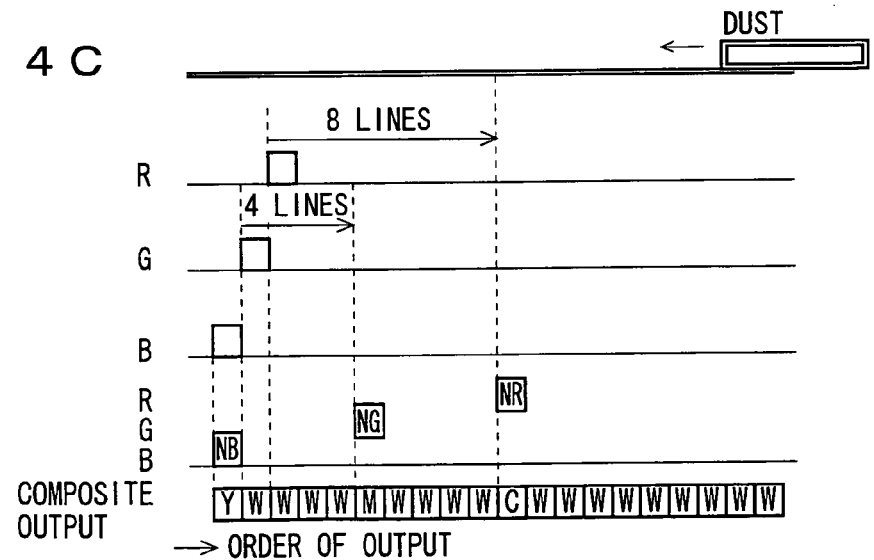

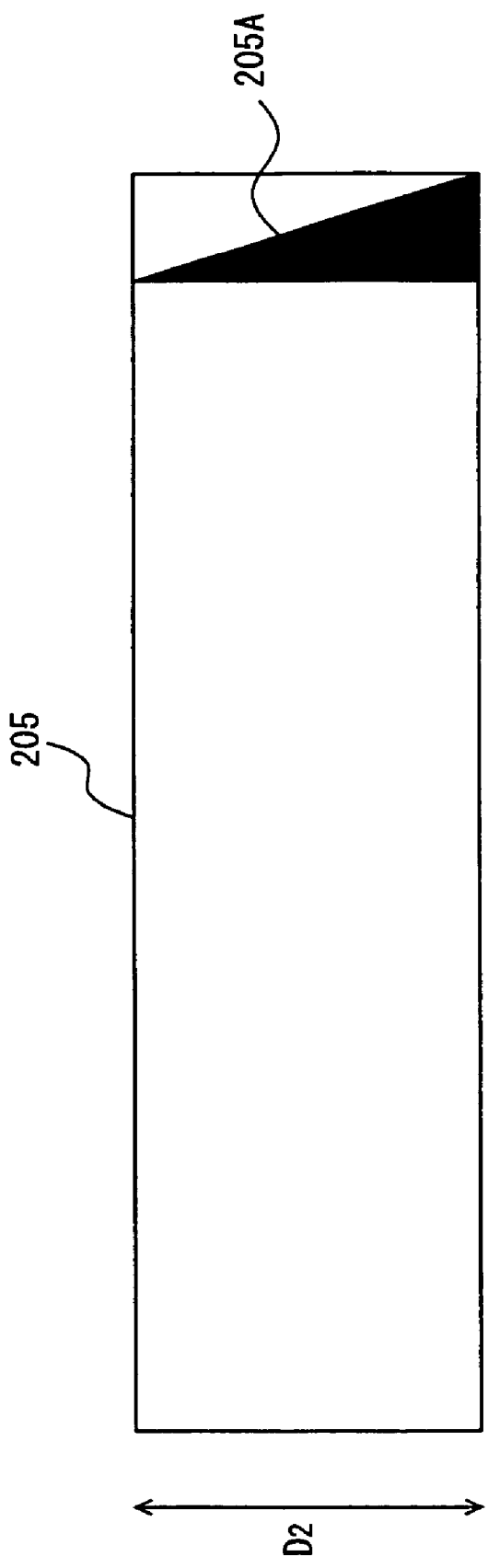

FIG. 13

| -1 | -1 | -1 |
|----|----|----|
| -1 | 8  | -1 |
| -1 | -1 | -1 |

FIRST INTERNAL EDGE
DETERMINATION FILTER

FIG. 14

| -1 | 0 | -1 | 0 | -1 |
|----|---|----|---|----|
| 0  | 0 | 0  | 0 | 0  |
| -1 | 0 | 8  | 0 | -1 |
| 0  | 0 | 0  | 0 | 0  |
| -1 | 0 | -1 | 0 | -1 |

SECOND INTERNAL EDGE
DETERMINATION FILTER

F I G. 1 5
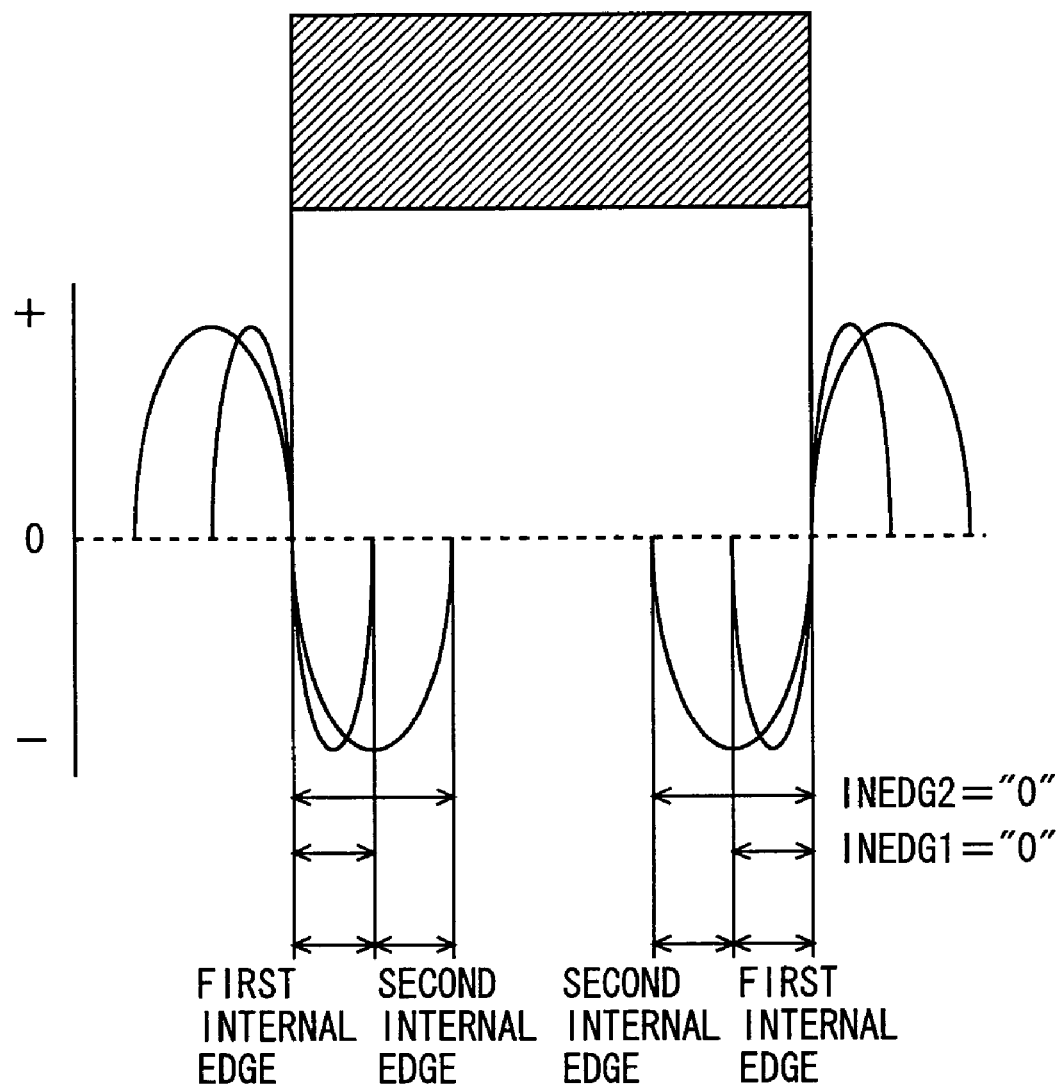

FIG. 19A

| | ATTRIBUTE | INEDG1 | INEDG2 | KAMI | C | M | Y | R | G | B | BLACK |
|---|---|---|---|---|---|---|---|---|---|---|---|
| FOURTH LINE UNIT | SOLID | 1 | 1 | 0 | 1 | 1 | 1 | 1 | 1 | 1 | 0 |
| THIRD LINE UNIT | SECOND INTERNAL EDGE | 1 | 0 | 0 | 1 | 1 | 1 | 0 | 1 | 1 | 1 |
| SECOND LINE UNIT | FIRST INTERNAL EDGE | 0 | 0 | 0 | 1 | 1 | 0 | 1 | 1 | 1 | 1 |
| FIRST LINE UNIT | BACKGROUND | 1 | 1 | 0 | 1 | 1 | 1 | 1 | 1 | 1 | 1 |

FIG. 19B

| | ATTRIBUTE | INEDG1 | INEDG2 | KAMI | C | M | Y | R | G | B | BLACK |
|---|---|---|---|---|---|---|---|---|---|---|---|
| FOURTH LINE UNIT | BACKGROUND | 1 | 1 | 0 | 1 | 1 | 1 | 1 | 1 | 1 | 1 |
| THIRD LINE UNIT | FIRST INTERNAL EDGE | 0 | 0 | 0 | 0 | 1 | 1 | 1 | 1 | 1 | 1 |
| SECOND LINE UNIT | SECOND INTERNAL EDGE | 1 | 0 | 0 | 1 | 1 | 1 | 1 | 1 | 0 | 1 |
| FIRST LINE UNIT | SOLID | 1 | 1 | 0 | 1 | 1 | 1 | 1 | 1 | 1 | 0 |

F I G. 2 0

| IMAGE AREA | DETERMINATION SIGNAL | | | | | | |
|---|---|---|---|---|---|---|---|
| | BLACK | C | M | Y | R | G | B | KAMI |
| ISOLATED POINT C | 1 | 0 | 1 | 1 | 1 | 1 | 1 | 1 |
| ISOLATED POINT M | 1 | 1 | 0 | 1 | 1 | 1 | 1 | 1 |
| ISOLATED POINT Y | 1 | 1 | 1 | 0 | 1 | 1 | 1 | 1 |
| ISOLATED POINT R | 1 | 1 | 1 | 1 | 0 | 1 | 1 | 1 |
| ISOLATED POINT G | 1 | 1 | 1 | 1 | 1 | 0 | 1 | 1 |
| ISOLATED POINT B | 1 | 1 | 1 | 1 | 1 | 1 | 0 | 1 |

F I G. 2 2

| 2 | 1 | 0 | 1 | 2 |

IMAGE READING APPARATUS CAPABLE OF DETECTING NOISE

This application is based on Japanese Patent Application No. 2004-326869 filed with the Japan Patent Office on Nov. 10, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of the Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhere on the platen's reading position, the line sensor will read the dust while reading a transported original. This provides an output image with noise in the form of a line in the sub scanning direction.

Japanese Laid-Open Patent Publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent Publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: a plurality of line sensors mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; an interline corrector synchronizing a plurality of data output from the plurality of line sensors to be values of pixels reading a single location on the original; and a noise detector receiving the plurality of data synchronized by the interline corrector that are provided successively line by line, and the noise detector includes an isolated noise determiner determining that an isolated point of a chromatic color is a noise pixel.

In accordance with the present invention an original is scanned in the sub scanning direction by a plurality of line sensors spaced in the sub scanning direction and between the original and the line sensors there is provided a platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location in the original. The image reading apparatus synchronizes the plurality of data output from the plurality of line sensors to be values of pixels reading a single location on the original, and the synchronized data are input successively line by line. Since the original and the noise are moved at different rates relative to the line sensors, the synchronized data are different from each other in respective locations of pixels resultant from reading the dust. The difference causes an isolated point of a chromatic color to be generated in composite data of the plurality of data. Since it is determined that the isolated point of the chromatic color is a noise pixel, the image reading apparatus provided is improved in precision with which noise due to dust on the platen is detected from a read image.

The present invention in another aspect provides an image reading apparatus including: a plurality of line sensors mutually spaced in a sub scanning direction to scan an original in the sub scanning direction; a platen arranged between the original and the plurality of line sensors; a mover moving the platen at a rate relative to the plurality of line sensors, the rate being different from that of the original relative to the plurality of line sensors; an interline corrector synchronizing at least three data output from the plurality of line sensors to be values of pixels reading a single location on the original; and a noise detector receiving the data synchronized by the interline corrector that are provided successively line by line, and the noise detector includes a region noise determiner determining that a group of pixels changing in color in a predetermined order in the sub scanning direction is a noise pixel.

In accordance with the present invention, a plurality of data output from a plurality of line sensors are synchronized to be values of pixels reading a single location on the original, and the synchronized data are input successively line by line. Since the original and the noise are moved at different rates relative to the line sensors, the synchronized data are different from each other in respective locations of pixels resultant from reading dust. The difference causes a region to be generated in the composite data of the plurality of data in which pixels change in color in a predetermined order in the sub scanning direction. Since it is determined that the region in which pixels change in color in a predetermined order is a noise pixel, the image reading apparatus provided is improved in precision with which noise due to dust on the platen is detected from a read image.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 3 is a perspective view of a mechanism employed to oscillate a platen.

FIGS. 4A-4C are diagrams for illustrating a theory of detecting noise generated by reading dust from a read image.

FIG. 5 is a rear plan view of the platen.

FIG. 13 shows an exemplary first internal edge determination filter.

FIG. 14 shows an exemplary second internal edge determination filter.

FIG. 15 illustrates first internal edge and second internal edge.

FIGS. 19A and 19B show exemplary lookup tables stored by the solid noise detector.

FIG. 20 shows an exemplary lookup table referenced by an isolated point noise detector.

FIG. 22 shows an exemplary noise removing filter.

DESCRIPTION OF THE PREFERRED EMBODIMENTS

Figure 2:
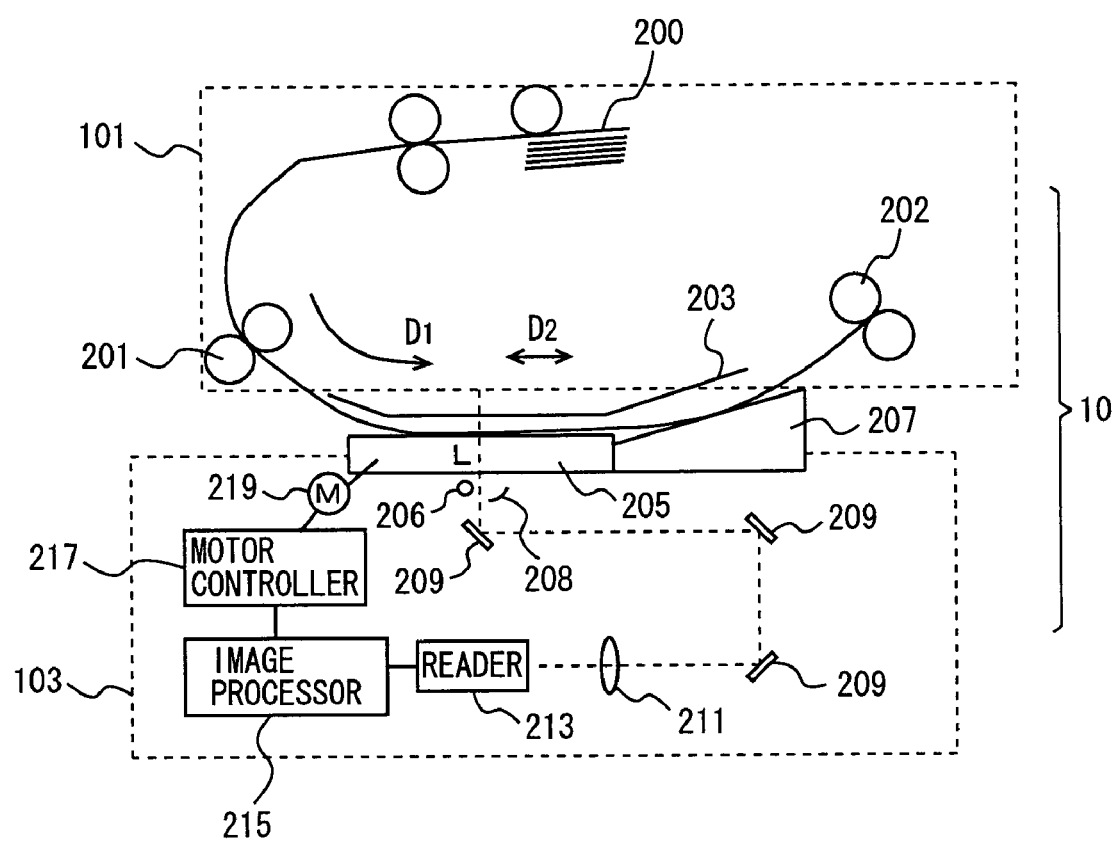
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to FIG. 1, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distances and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Platen 205 formed of a transparent material is a flat plate of such a material as glass or resin.

Note that while in the present embodiment reader 213 is provided with three line sensors, it may be provided with four or more line sensors.

FIG. 3 is a perspective view showing a mechanism employed to oscillate the platen. With reference to FIG. 3, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at positions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original move in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow. Platen 205 is moved at a rate which is the same in direction as and four-thirds in magnitude that at which the original is transported. Further, it is supposed here for convenience of description that the original is white and dust is black in color and that the colors of white, black, cyan, magenta, yellow, red, green, and blue are represented by respective symbols W, K, C, M, Y, R, G, and B. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when the platen is moved in the same direction as the direction in which the original is transported while dust adhering on the platen is read. In FIG. 4B, the original and platen 205 are transported in the direction indicated by the arrow and platen 205 is moved at a rate which is the same in direction as and 4/3 times in magnitude as fast as that at which the original is transported. The size of the dust corresponds to 20/3 lines in the sub scanning direction. Since platen 205 is moved at the rate which is the same in direction as and 4/3 times in magnitude as fast as that at which the original is transported, the read dust has its size corresponding to five lines.

The dust adhering on platen 205 is first read by the red light receiving line sensor arranged most upstream in the direction in which the original is transported. Since the dust is moved at the speed 4/3 times as fast as the original, the dust is moved by the distance corresponding to four lines while three lines of the original are read and the dust is read by the green light receiving line sensor. Then, while further three lines of the original are read, the dust is moved by the distance corresponding to four lines and the dust is read by the blue light receiving line sensor.

By interline correction the red light receiving line sensor reading the dust outputs R delayed by eight lines and the green light receiving line sensor reading the dust outputs G delayed by four lines. As such, interline corrected outputs R, G and B composited together provide a composite output in which output R of five lines provided from the red light receiving line sensor having read the dust, output G of five lines provided from the green light receiving line sensor having read the dust, and output B of five lines provided from the blue light receiving line sensor having read the dust are not composited at the same timing, but are offset by one line. Therefore, although the black dust is read here, the composite output has the color changing in the order of WYRKKKBC . . .

FIG. 4C is a diagram for illustrating a composite output provided when the platen is moved in the direction opposite to that of the original while dust adhering on the platen is read. In FIG. 4C, platen 205 is moved in the opposite direction to that of the original and at a rate four times as fast as the original. The size of the dust here corresponds to four lines in the sub scanning direction. Since platen 205 is moved at the rate four times as fast as the rate at which the original is transported and in the direction opposite to that in which the original is transported, the read dust has the size corresponding to one line.

The dust adhering on platen 205 is first read by the blue light receiving line sensor arranged most downstream in the direction in which the original is transported. Since the dust is moved at the rate four times as fast as the original, the dust is moved by the distance corresponding to four lines while one line of the original is read and the dust is read by the green light receiving line sensor. Then, while a further one line of the original is read, the dust is moved by the distance corresponding to four lines and the dust is read by the blue light receiving line sensor.

By interline correction the red light receiving line sensor reading the dust outputs R delayed by eight lines and the green light receiving line sensor reading the dust outputs G delayed by four lines. As such, interline corrected outputs R, G and B composited together provide a composite output in which output R of one line provided from the red light receiving line sensor having read the dust, output G of one line provided from the green light receiving line sensor having read the dust, and output B of one line provided from the blue light receiving line sensor having read the dust are not composited at the same timing, but are offset by five lines. Therefore, although the black dust is read here, the composite output has the color changing in the order of . . . WYWWW-WMWWWWCWW . . . , resulting in an isolated point of a single color of Y, that of M and that of C.

FIG. 5 is a plan, rear view of the platen. With reference to FIG. 5, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

Figure 6:
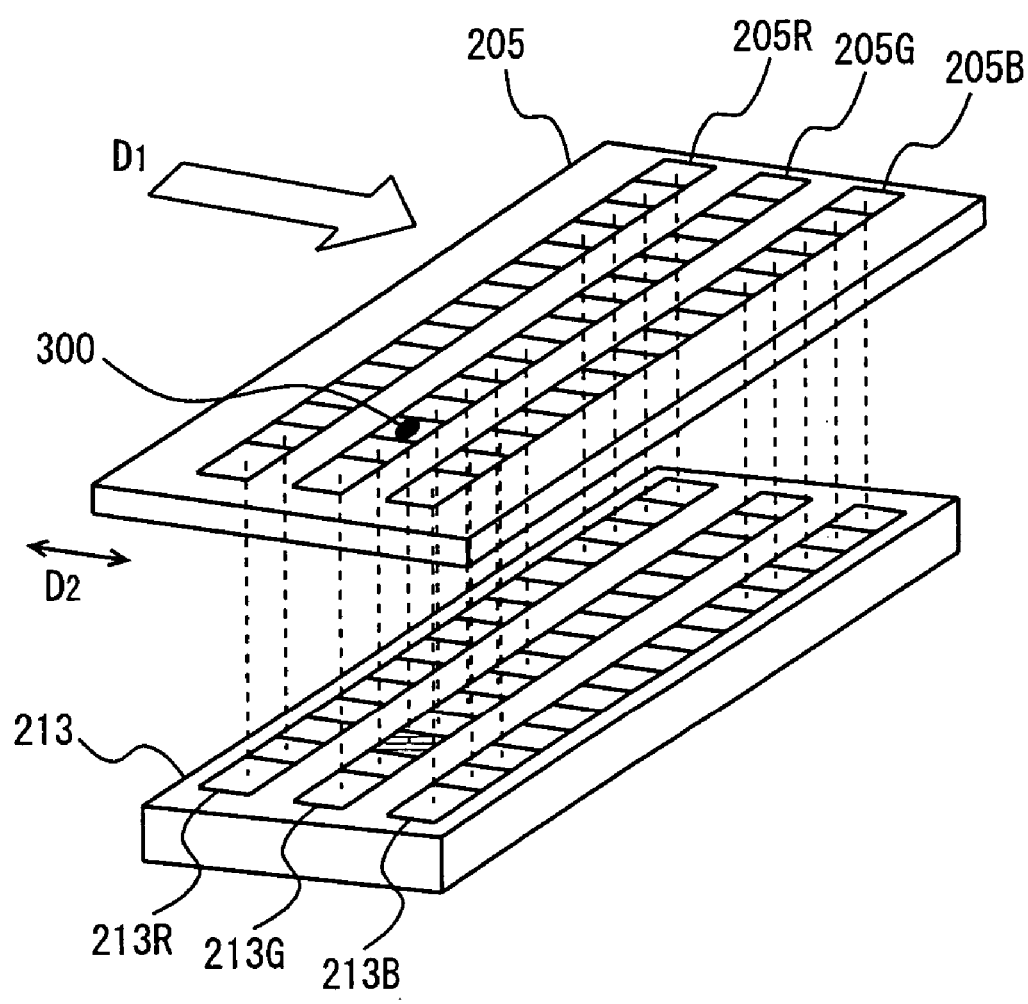
FIG. 6 shows a position on a platen read by a reader.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves past region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

Figure 7:
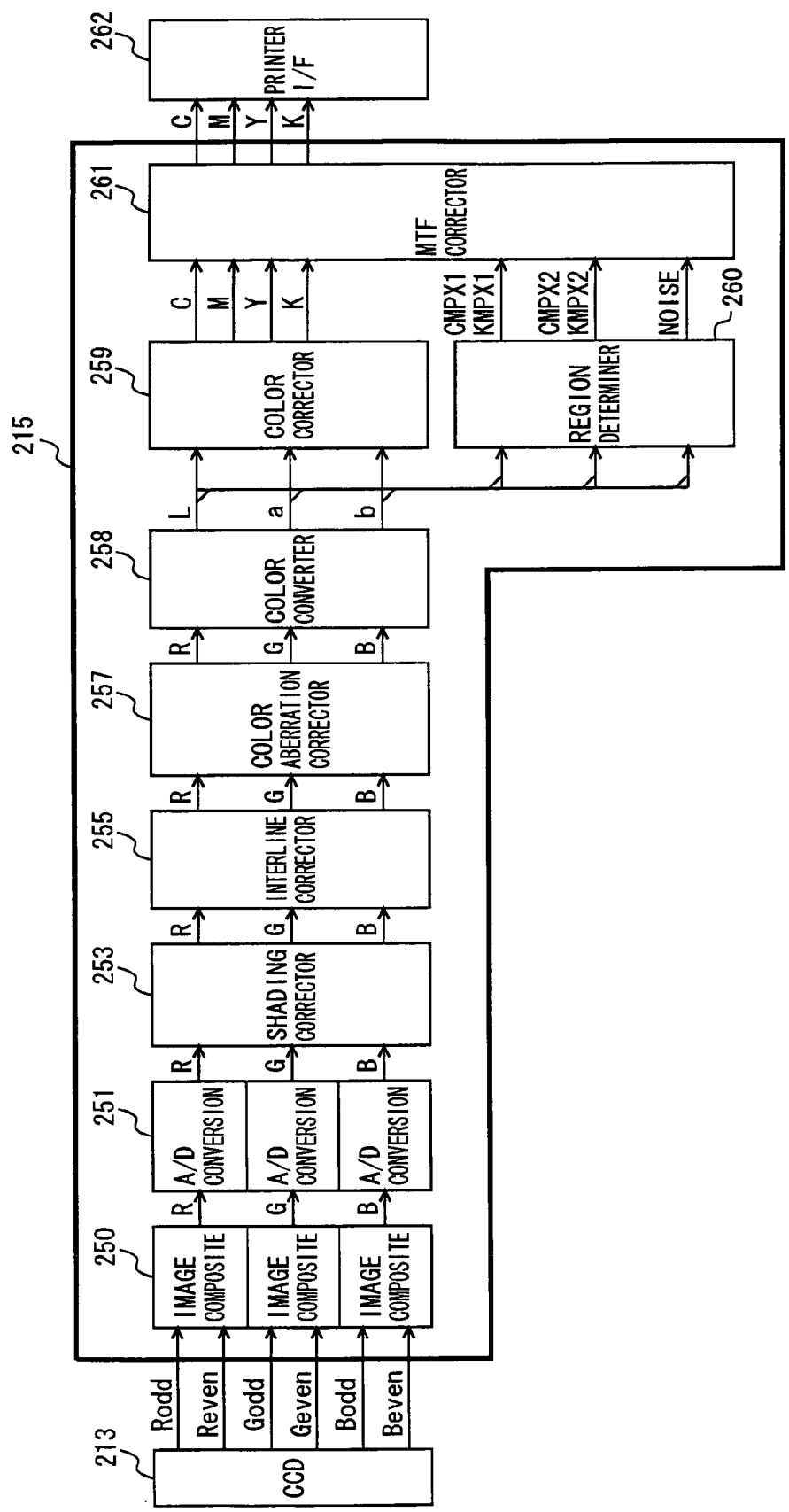
FIG. 7 is a block diagram showing a configuration of an image processor of the image reading apparatus in the present embodiment.

FIG. 7 is a block diagram showing a configuration of the image processor of the image reading apparatus in the present embodiment. With reference to FIG. 7, image processor 215 is connected to a CCD 213 and a printer interface 262. To image processor 215, R, G and B signals are input from reader 213. The input R, G and B signals have respective signals Reven, Geven and Beven that are even-numbered signals with respect to the main scanning direction as well as respective signals Rodd, Godd and Bodd that are odd-numbered signals with respect to the main scanning direction.

Image processor 215 includes an image composite unit 250 that composites the even-numbered signal and the odd-numbered signal of the R, G and B signals each into an analogue signal for one line and outputs the resultant analog signals, an analog/digital (A/D) converter 251 that converts the composited analog signals R, G and B into respective digital signals, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a color converter 258 converting the R, G and B signals from the RGB color system into the L*a*b* color system, a color corrector 259 converting the L*a*b* signals into the CMYK color system, a region determiner 260 determining whether a pixel is a noise pixel or not based on the L*a*b* signals, and an MTF corrector 261 correcting CMYK signals corresponding to noise pixels according to control signals from region determiner 260. MTF corrector 261 outputs the corrected CMYK signals to printer interface 262.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines. To region determiner 260, the signals synchronized by interline corrector 255 are thus input successively line by line.

Region determiner 260 receives the L*a*b* signals from color converter 258 to determine, pixel by pixel, whether or not a pixel is a noise pixel, and outputs a noise signal NOISE for each pixel to be processed. Noise signal NOISE is "0" when a pixel is a noise pixel and "1" when the pixel is not a noise pixel.

Further, region determiner 260 outputs, for each pixel, attribute signals CMPX1 and KMPX1 indicating whether a pixel is a pixel included in a dot region, a pixel included in an edge region or a pixel included in a solid region. Attribute signal CMPX1 is a signal indicating an attribute of a chromatic-color pixel. Attribute signal CMPX1 is "0" when the pixel is in a dot region, "1" when the pixel is in an edge region and "2" when the pixel is in a solid region. Attribute signal KMPX1 is a signal indicating an attribute of an achromatic-color pixel. Attribute signal KMPX1 is "0" when the pixel is in a dot region, "1" when the pixel is in an edge region and "2" when the pixel is in a solid region.

Region determiner 260 also outputs, for each pixel to be processed, edge signals CMPX2 and KMPX2 for indicating that the pixel is an edge pixel. Edge signal CMPX2 is a signal indicating whether a pixel is an edge pixel included in an edge region of a chromatic color. Edge signal CMPX2 is "0" when the edge pixel is a chromatic-color edge pixel and "1" when the edge pixel is not a chromatic-color edge pixel. Edge signal KMPX2 is a signal indicating whether a pixel is an edge pixel included in an edge region of an achromatic color. Edge signal KMPX2 is "0" when the edge pixel is an achromatic-color edge pixel and "1" when the edge pixel is not an achromatic-color edge pixel.

MTF corrector 261 corrects CMYK signals corresponding to noise pixels from color corrector 259 based on signal NOISE from region determiner 260. Further, MTF corrector 261 corrects the CMYK signals from color corrector 259 based on attribute signals CMPX1 and KMPX1 from region determiner 260. The correction includes for example edge enhancement of an edge region, smoothing of a dot region and a minimum filtering of a character region. A solid region is not processed.

Figure 8:
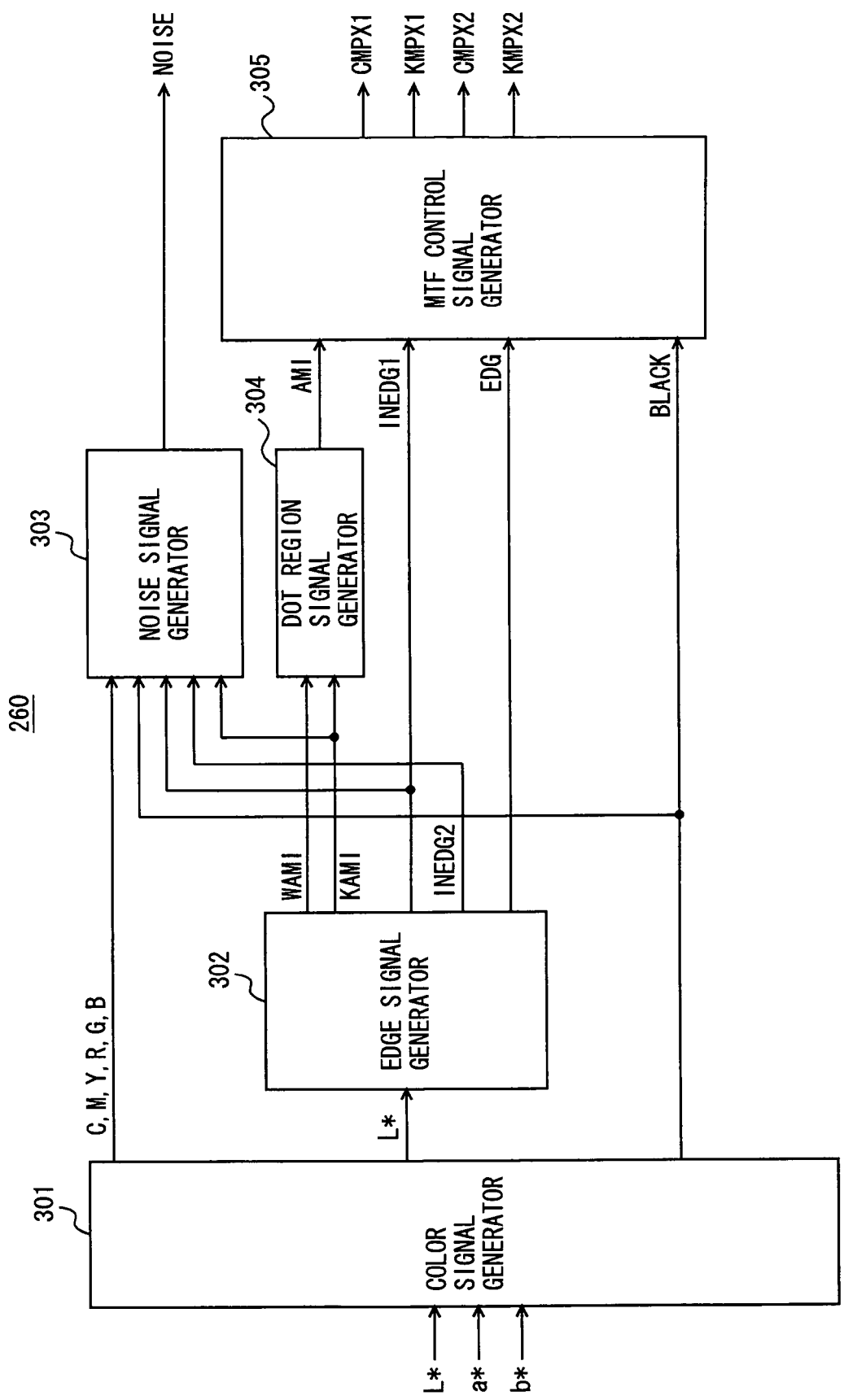
FIG. 8 is a block diagram showing in detail a configuration of a region determiner.

FIG. 8 is a block diagram showing in detail a configuration of the region determiner. With reference to FIG. 8, region determiner 260 includes a color signal generator 301 generating color signals C, M, Y, R, G, B and a black signal BLACK, an edge signal generator 302 generating such edge signals as first and second internal edge signals INEDG1, INEDG2 from lightness signal L*, a noise signal generator 303 determining whether a pixel is a noise pixel or not to generate noise signal NOISE, a dot region signal generator 304 generating a dot signal AMI, and an MTF control signal generator 305 generating MTF control signals to be output to MTF corrector 261.

Color signal generator 301 receives the L*, a* and b* signals. Lightness signal L* is directly output to edge signal generator 302. The signals L*, a* and b* are used for identifying the color of a pixel. Color signal generator 301 identifies the color of each pixel to output a signal indicating the color of the pixel. When color signal generator 301 identifies the color of a pixel as black, it outputs black signal BLACK. In the same manner, color signal generator 301 outputs color signals C, M, Y, R, G, and B when it identifies respective colors of signals as cyan, magenta, yellow, red, green and blue.

Edge signal generator 302 receives lightness signal L*. For each pixel, edge signal generator 302 generates from lightness signal L* a white isolated point signal WAMI, a black isolated point signal KAMI, first internal edge signal INEDG1, second internal edge signal INEDG2, and an edge signal EDG. Edge signal generator 302 outputs black isolated point signal KAMI, first internal edge signal INEDG1 and second internal edge signal INEDG2 to noise signal generator 303, outputs white isolated point signal WAMI and black isolated point signal KAMI to dot region signal generator 304, and outputs first internal edge signal INEDG1 and edge signal EDG to MTF control signal generator 305.

White isolated point signal WAMI is a signal for indicating a pixel included in a region of relatively high lightness as compared with neighboring regions, and is "0" when a pixel to be processed is a white isolated point and is "1" when the pixel is not a white isolated point. Black isolated point signal KAMI is a signal for indicating a pixel included in a region of relatively low lightness as compared with neighboring regions, and is "0" when a pixel to be processed is a black isolated point and is "1" when the pixel is not a black isolated point.

First internal edge signal INEDG1 is a signal for indicating one of pixels included in an area having its lightness changed of an edge region, and is "0" when a pixel to be processed is a first internal edge and is "1" when the pixel is not a first internal edge. Second internal edge signal INEDG2 is a signal for indicating one of pixels included in the area having its lightness changed of the edge region and its neighboring area, and is "0" when a pixel to be processed is a second internal edge and is "1" when the pixel is not a second internal edge.

Edge signal EDG is a signal for indicating a pixel included in an edge region. Edge signal EDG is "0" when a pixel to be processed is an edge and is "1" when the pixel is not an edge.

Noise signal generator 303 receives color signals C, M, Y, K, R, G, B, black signal BLACK, black isolated point signal KAMI, first internal edge signal INEDG1, and second internal edge signal INEDG2. According to these signals, noise signal generator 303 determines whether a pixel to be processed is a noise pixel or not. Then, noise signal generator 303 generates and outputs noise signal NOISE for indicating a noise pixel. Noise signal NOISE is "0" when a pixel to be processed is a noise pixel and is "1" when the pixel is not a noise pixel.

Dot region signal generator 304 receives white isolated point signal WAMI and black isolated point signal KAMI. Dot region signal generator 304 generates and outputs to MTF control signal generator 305 dot signal AMI for indicating a white isolated point or a black isolated point. Dot signal AMI is "0" when a pixel to be processed is a white isolated point or black isolated point and is "1" when the pixel is not a white or black isolated point.

MTF control signal generator 305 receives dot signal AMI, first internal edge signal INEDG1, edge signal EDG, and black signal BLACK, and outputs edge signals CMPX2 and KMPX2 that are generated by inverting edge signal EDG. Edge signal CMPX2 is output to a cyan corrector, a magenta corrector and a yellow corrector of MTF corrector 261, and is "1" when a pixel to be processed is included in an edge region and is "0" when the pixel is not included in an edge region. Edge signal KMPX2 is output to a black corrector of MTF corrector 261 and is "1" when a pixel to be processed is included in an edge region and is "0" when the pixel is not included in an edge region.

MTF control signal generator 305 generates attribute signals CMPX1 and KMPX1 from dot signal AMI, first internal edge signal INEDG1, edge signal EDG and black signal BLACK.

Attribute signals CMPX1 and KMPX1 are signals for indicating an attribute of a pixel to be processed. Here, the attribute of the pixel includes dot, external edge, internal edge of a black character, and solid. First MTF control signal CMPX1 is "0" when the attribute of a pixel to be processed is dot, "1" when that of the pixel is external edge or internal edge of a black character, and "2" or "3" ("3" is not usually used) when that of the pixel is solid. Second MTF control signal KMPX1 is "0" when the attribute of a pixel to be processed is dot, "1" when that of the pixel is external edge of a character and "2" or "3" when that of the pixel is solid.

When it is determined that a pixel to be processed is an isolated point, the attribute of the pixel is indicated as dot. Accordingly, when dot signal AMI is "0", the attribute of the pixel is dot.

The external edge refers to an attribute of a pixel that is included in an area of low lightness in a region where the lightness changes from low to high and is adjacent to an area of high lightness. When it is determined from edge signal EDG that a pixel to be processed is included in an edge region while it is determined from the first internal edge signal that the pixel is not first internal edge, the attribute of the pixel is indicated as external edge. Accordingly, when the edge signal is "0" and the first internal edge signal is "1", the attribute of the pixel is external edge.

When it is determined that a pixel to be processed is black and first internal edge, the attribute of the pixel is indicated as internal edge of a black character. Accordingly, when black signal BLACK is "0" and the first internal edge signal is "0", the attribute of the pixel is internal edge of a black character.

When it is determined that a pixel to be processed is not included in an edge region and is not dot, the attribute of the pixel is indicated as solid. Accordingly, when edge signal EDG is "1" and dot signal AMI is "1", the attribute of the pixel is solid.

Figure 9:
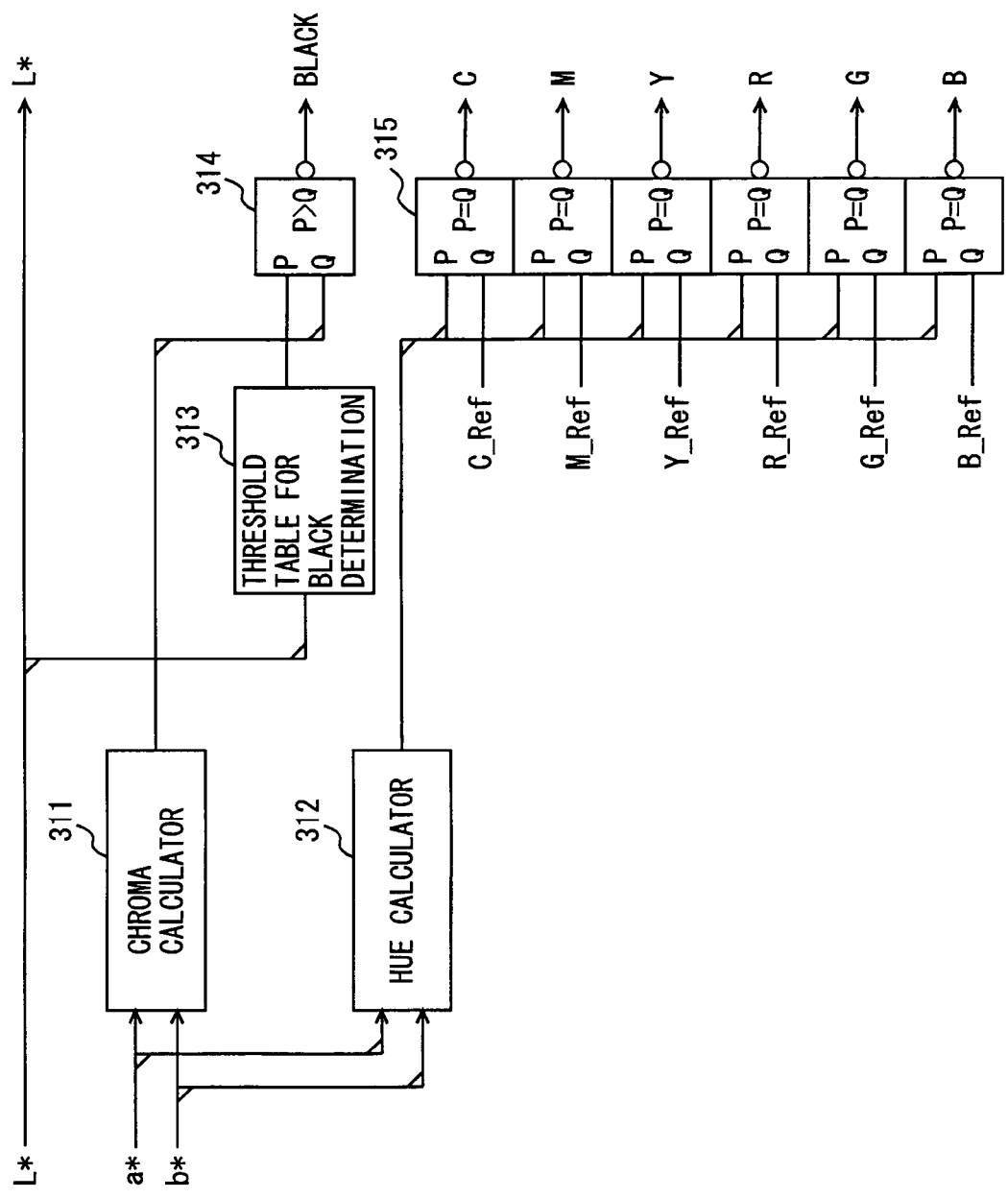
FIG. 9 is a block diagram showing in detail a configuration of a color signal generator.

FIG. 9 is a block diagram showing in detail a configuration of the color signal generator. With reference to FIG. 9, color signal generator 301 includes a chroma calculator 311 calculating chroma from signals a* and b*, a threshold table for black determination 313 defining thresholds for black determination with respect to lightness L*, a black determination circuit 314 comparing the calculated chroma with a threshold for black determination to output color signal BLACK, a hue calculator 312 calculating hue from signals a* and b*, and a color determination circuit 315 comparing the calculated hue with a predetermined threshold of colors C, M, Y, R, G and B each to output color signals C, M, Y, R, G and B.

Chroma calculator 311 receives the signals a* and b* to calculate the chroma according to the following expression (1). Hue calculator 312 receives the signals a* and b* to calculate the hue according to the following expression (2).

$$\sqrt{(a^*)^2 + (b^*)^2} \quad (1)$$

$$\tan^{-1}\left(\frac{b^*}{a^*}\right) \quad (2)$$

Figure 10:
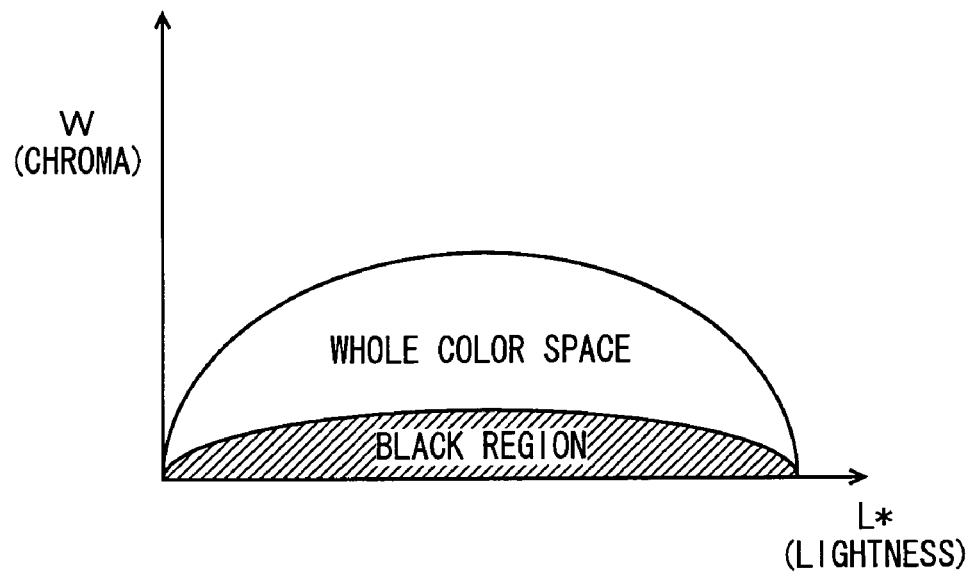
FIG. 10 illustrates a threshold table for black determination.

The table for black determination defines thresholds for black determination with respect to lightness L*. FIG. 10 is shown to describe the threshold table for black determination. A graph shown in FIG. 10 has the horizontal axis indicating lightness L* and the vertical axis indicating chroma W. For the distribution of lightness L* and chroma W in the L*a*b color space, a black region that is hatched represents black. Pixels of low chroma are determined as black to be subjected to following processing so that the image quality is improved. The threshold table for black determination is a table showing a correspondence between chroma W and its corresponding lightness L*.

With reference again to FIG. 9, threshold table for black determination 313 receives lightness L* to output a threshold for black determination corresponding to this lightness L* to black determination circuit 314. Black determination circuit 314 receives the chroma calculated by chroma calculator 311 and the threshold for black determination to determine a pixel as black when the chroma is smaller than the black determination threshold, and outputs black signal BLACK. Black signal BLACK is "0" when a pixel is determined as black and "1" when the pixel is not determined as black.

Figure 11:
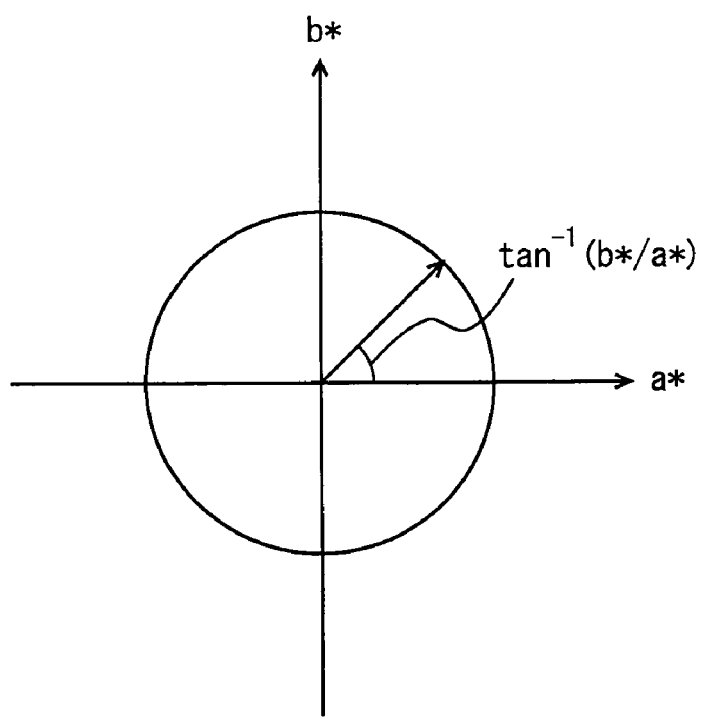
FIG. 11 is provided for describing hue.

FIG. 11 is provided for describing the hue. With reference to FIG. 11 showing a graph with the horizontal axis indicating a* and the vertical axis indicating b*, the hue is represented by angle θ formed by the horizontal axis and the straight line between coordinate (a*, b*) and the point of origin.

With reference further again to FIG. 9, color determination circuit 315 includes respective determination circuits for cyan (C), magenta (M), yellow (Y), red (R), green (G), and blue (B). The determination circuits each receive the hue calculated by hue calculator 312 and corresponding one of reference values C_Ref, M_Ref, Y_Ref, R_Ref, G_Ref, and B_Ref determined in advance for respective colors. Reference value C_Ref is a reference value of the hue representing cyan, reference value M_Ref is a reference value of the hue representing magenta, reference value Y_Ref is a reference value of the hue representing yellow, reference value R_Ref is a reference value of the hue representing red, reference value G_Ref is a reference value of the hue representing green, and reference value B_Ref is a reference value of the hue representing blue. Since the determination circuits operate in the same manner, color determination circuit 315 for cyan (C) is representatively described here. Color determination circuit 315 compares the hue calculated by hue calculator 312 with reference value C_Ref to determine that a pixel is cyan when they are identical to each other and determine that the pixel is not cyan when they are not identical to each other. Color signal C is "0" when a pixel is determined as cyan and "1" when the pixel is not determined as cyan. Similarly, color signal M is "0" when a pixel is determined as magenta and "1" when the pixel is not determined as magenta. Color signal Y is "0" when a pixel is determined as yellow and "1" when the pixel is not determined as yellow. Color signal R is "0" when a pixel is determined as red and "1" when the pixel is not determined as red. Color signal G is "0" when a pixel is determined as green and "1" when the pixel is not determined as green. Color signal B is "0" when a pixel is determined as blue and "1" when the pixel is not determined as blue.

Figure 12:
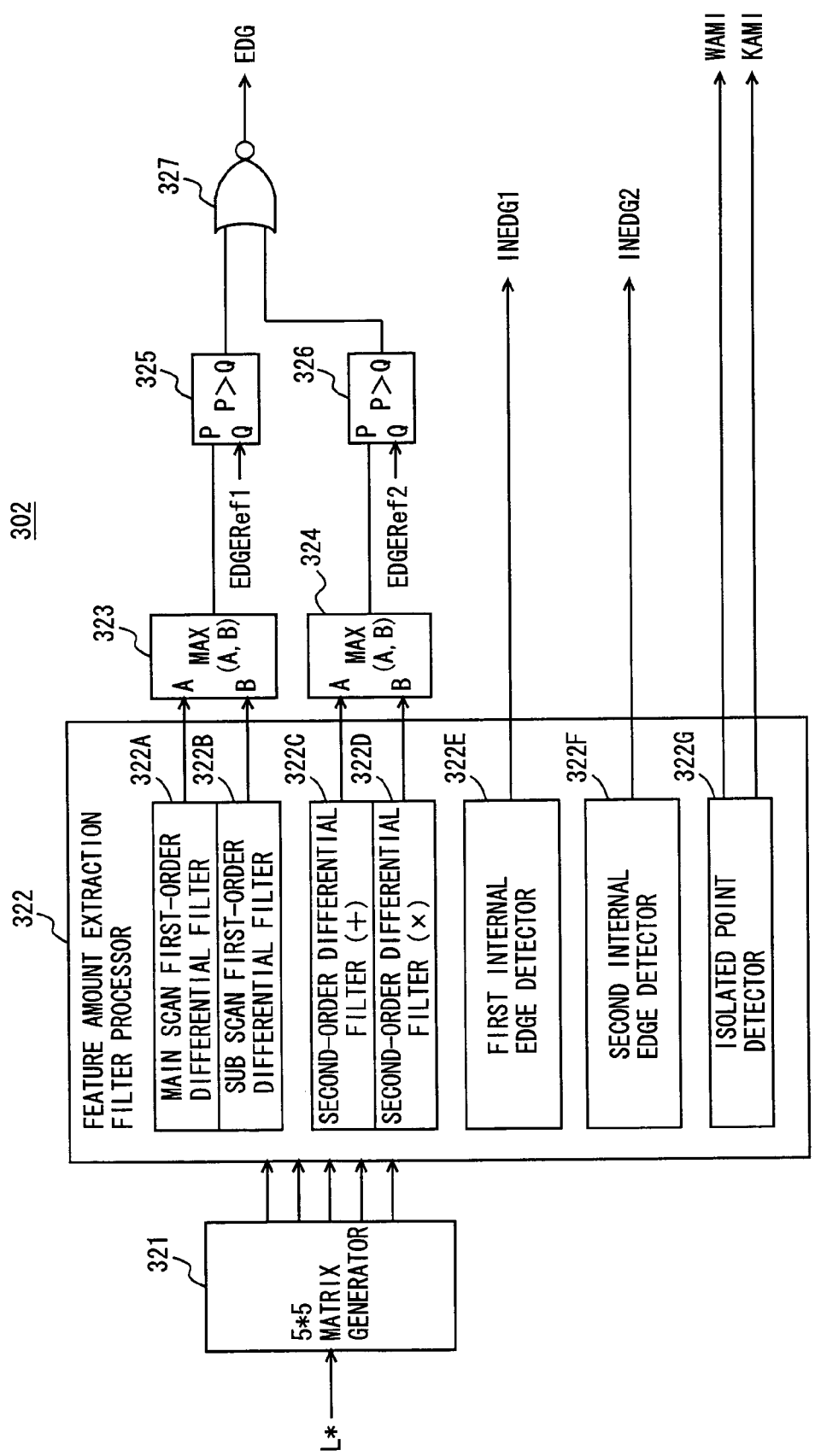
FIG. 12 is a block diagram showing in detail a configuration of an edge signal generator.

FIG. 12 is a block diagram showing in detail a configuration of the edge signal generator. With reference to FIG. 12, edge signal generator 302 includes a 5*5 matrix generator 321, a feature amount extraction filter processor 322, maximum value selection circuits 323, 324, determination circuits 325, 326, and a logical OR circuit 327.

Edge signal generator 302 receives lightness L* line by line successively. 5*5 matrix generator 321 has line delay circuits for five lines to generate matrix data of five by five pixels and output the generated matrix data to feature amount extraction filter processor 322.

Feature amount extraction filter processor 322 includes a main scan first-order differential filter 322A, a sub scan first-order differential filter 322B, a first second-order differential filter 322C, a second second-order differential filter 322D, a first internal edge detector 322E, a second internal edge detector 322F, and an isolated point detector 322G.

Main scan first-order differential filter 322A is a filter for detecting a change in lightness in the main scanning direction. This filter outputs for example the difference between the lightness of a pixel to be processed and the average lightness of four pixels adjacent to the pixel in the main scanning direction. Main scan first-order differential filter 322A is used for detecting an edge in the main scanning direction. The output of main scan first-order differential filter 322A is provided to maximum value selection circuit 323.

Sub scan first-order differential filter 322B is a filter for detecting a change in lightness in the sub scanning direction. This filter outputs for example the difference between the lightness of a pixel to be processed and the average lightness of four pixels adjacent to the pixel in the sub scanning direction. Sub scan first-order differential filter 322B is used for detecting an edge in the sub scanning direction. The output of sub scan first-order differential filter 322B is provided to maximum value selection circuit 323.

The first second-order differential filter 322C is a filter for calculating a value that indicates the difference in lightness between a pixel to be processed and pixels adjacent thereto in the main scanning direction and the sub scanning directions. The first second-order differential filter 322C thus detects edge pixels in the main scanning direction and the sub scanning direction. The filter is particularly suitable for detecting an edge region constituted of one pixel or two pixels. The output of the first second-order differential filter 322C is provided to maximum value selection circuit 324.

The second second-order differential filter 322D is a filter for calculating a value that indicates the difference in lightness between a pixel to be processed and pixels adjacent thereto at an angle of ±45° oblique to the main scanning direction. The second second-order differential filter 322D thus detects edge pixels adjacent to the pixel to be processed at the angle ±45° oblique to the main scanning direction. The filter is particularly suitable for detecting an edge region constituted of one pixel or two pixels. The output of the second second-order differential filter 322D is provided to maximum value selection circuit 324.

Maximum value selection circuit 323 outputs to determination circuit 325 a larger one of the output of main scan first-order differential filter 322A and the output of sub scan first-order differential filter 322B. Determination circuit 325 determines that a pixel to be processed is an edge when the larger one of the output of main scan first-order differential filter 322A and that of sub scan first-order differential filter 322B is larger than a predetermined threshold value EDG-ERef1. Determination circuit 325 outputs signal "1" when it determines that the pixel is an edge to logical OR circuit 327 and outputs signal "0" thereto when the pixel is not an edge.

Maximum value selection circuit 324 outputs to determination circuit 326 a larger one of the output of the first second-order differential filter 322C and the output of the second second-order differential filter 322D. Determination circuit 326 determines that a pixel to be processed is an edge when the larger one of the output of the first second-order differential filter 322C and that of the second second-order differential filter 322D is larger than a predetermined threshold value EDGERef2. Determination circuit 326 outputs signal "1" when it determines that the pixel is an edge to logical OR circuit 327 and outputs signal "0" thereto when the pixel is not an edge.

Logical OR circuit 327 outputs edge signal EDG for indicating that the pixel to be processed is an edge pixel when one of determination circuits 325 and 326 outputs signal "1". Edge signal EDG is "0" when the pixel is an edge pixel and is "1" when the pixel is not an edge pixel.

Accordingly, edge signal EDG is a signal indicating that a pixel to be processed is an edge pixel when one of an edge in the main scanning direction, an edge in the sub scanning direction, an edge in the main and sub scanning directions and an edge at an angle of ±45° oblique to the main scanning direction is detected.

The first internal edge detector 322E has a first internal edge determination filter. When a value calculated by using the filter exceeds a predetermined threshold value, the first internal edge detector 322E determines that a pixel to be processed is first internal edge and outputs first internal edge signal INEDG1. First internal edge signal INEDG1 is "0" when it is determined that the pixel is first internal edge and is "1" when it is determined that the pixel is not first internal edge.

FIG. 13 shows an exemplary first internal edge determination filter. With reference to FIG. 13, the first internal edge determination filter is a matrix of three by three pixels showing at its center a weighing factor of "8" of a pixel to be processed and a weighing factor of "−1" of other pixels. The sum of respective products of the pixel values of the matrix data and respective weighting factors at corresponding positions of the first internal edge determination filter is calculated. When the calculated sum is larger than a predetermined threshold value, it is determined that the pixel to be processed is second internal edge.

The second internal edge detector 322F has a second internal edge determination filter. When a value calculated by using the filter exceeds a predetermined threshold value, the second internal edge detector 322F determines that a pixel to be processed is second internal edge and outputs second internal edge signal INEDG2. Second internal edge signal INEDG2 is "0" when it is determined that the pixel is second internal edge and is "1" when it is determined that the pixel is not second internal edge.

FIG. 14 shows an exemplary second internal edge determination filter. With reference to FIG. 14, the second internal edge determination filter is a matrix of five by five pixels showing at its center a weighing factor of "8" of a pixel to be processed and a weighing factor of "−1" of pixels in the vertical and horizontal directions and at four corners with respect to the pixel to be processed, each with one pixel therebetween. A weighting factor of "0" is indicated for remaining pixels. The sum of respective products of the pixel values of the matrix data and respective weighting factors at corresponding positions of the second internal edge determination filter is calculated. When the calculated sum is larger than a predetermined threshold value, it is determined that the pixel to be processed is second internal edge.

FIG. 15 illustrates the first internal edge and the second internal edge. With reference to FIG. 15, the first internal edge refers to a pixel that is included in a region in which the lightness changes from high to low and is a pixel changing in lightness first from high to low. The second internal edge refers to a pixel that is included in the region in which the lightness changes from high to low and is a pixel changing in lightness second from high to low. Further, the first internal edge refers to a pixel that is included in a region in which the lightness changes from low to high and is a pixel changing in lightness first from low to high. The second internal edge further refers to a pixel that is included in the region in which the lightness changes from low to high and is a pixel changing in lightness second from low to high.

When first internal edge signal INEDG1 output from the first internal edge detector 322E is "0" and second internal edge signal INEDG2 output from the second internal edge detector 322F is "0", the pixel to be processed corresponds to internal edge 1. When first internal edge signal output from the first internal edge detector 322E is "1" and second internal edge signal INEDG2 output from the second internal edge detector 322F is "0", the pixel to be processed corresponds to internal edge 2.

Figure 16:
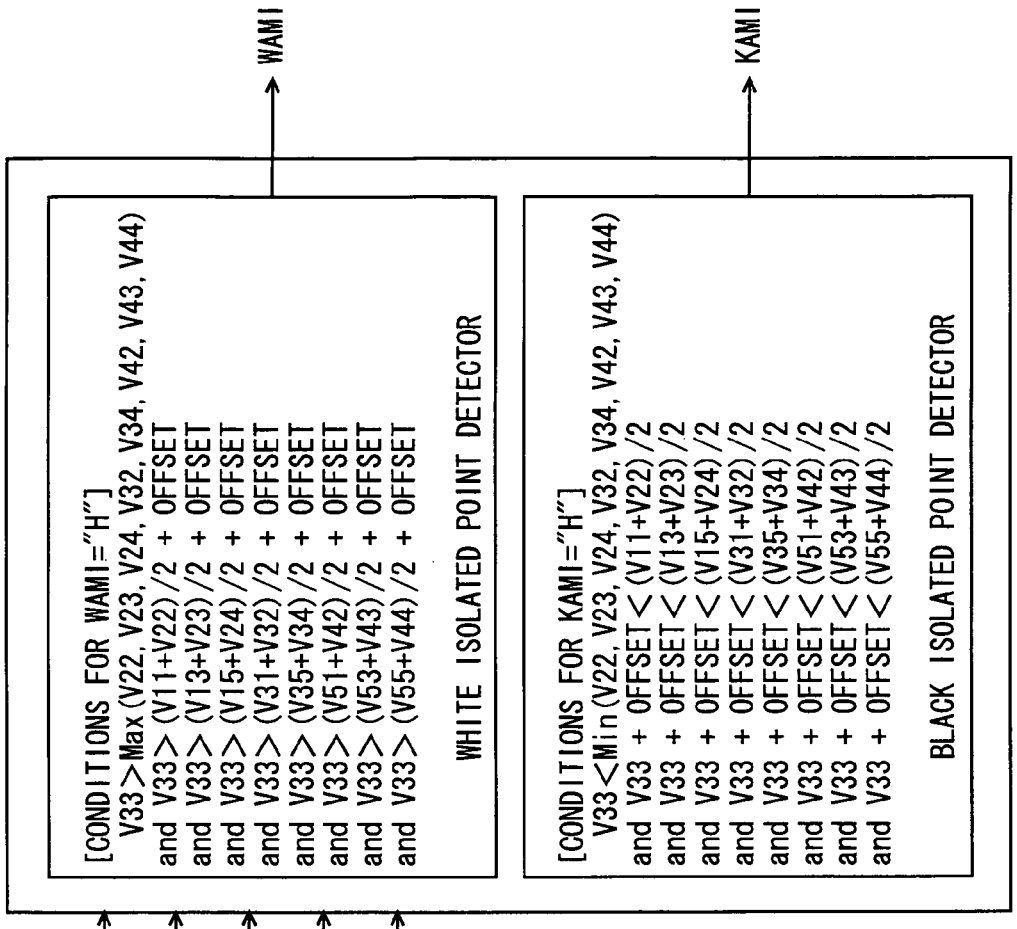
FIG. 16 is a block diagram showing in detail a configuration of an isolated point detector.

FIG. 16 is a block diagram showing in detail a configuration of the isolated point detector. With reference to FIG. 16, the isolated point detector includes a white isolated point detector and a black isolated point detector. In FIG. 16, Vi j represents the value of a pixel at each position of the matrix data that is provided to isolated point detector 322G. Variable i represents a row and variable j represents a column. A pixel value of V33 of i=j=3 represents the pixel value of a pixel to be processed that is located at the center of the matrix data.

The white isolated point detector determines that the pixel to be processed is a white isolated point of high lightness when the following inequalities (3) are all satisfied, and outputs white isolated signal WAMI according to the result of the determination. White isolated point signal WAMI is "1" when it is determined that the pixel is a white isolated point and is "0" when the pixel is not a white isolated point.

The black isolated point detector determines that the pixel to be processed is a black isolated point of low lightness when the following inequalities (4) are all satisfied, and outputs black isolated signal KAMI according to the result of the determination. Black isolated point signal KAMI is "1" when it is determined that the pixel is a black isolated point and is "0" when the pixel is not a black isolated point.

$$\left.\begin{array}{l} V33 > \operatorname{Max}(V22, V23, V24, V32, V34, V42, V43, V44) \\ \text{and } V33 > (V11 + V22)/2 + \text{OFFSET} \\ \text{and } V33 > (V13 + V23)/2 + \text{OFFSET} \\ \text{and } V33 > (V15 + V24)/2 + \text{OFFSET} \\ \text{and } V33 > (V31 + V32)/2 + \text{OFFSET} \\ \text{and } V33 > (V35 + V34)/2 + \text{OFFSET} \\ \text{and } V33 > (V51 + V42)/2 + \text{OFFSET} \\ \text{and } V33 > (V53 + V43)/2 + \text{OFFSET} \\ \text{and } V33 > (V55 + V44)/2 + \text{OFFSET} \end{array}\right\} \quad (3)$$

-continued $$V33 < \text{Min}(V22, V23, V24, V32, V34, V42, V43, V44) \\ \text{and } V33 + \text{OFFSET} < (V11 + V22)/2 \\ \text{and } V33 + \text{OFFSET} < (V13 + V23)/2 \\ \text{and } V33 + \text{OFFSET} < (V15 + V24)/2 \\ \text{and } V33 + \text{OFFSET} < (V31 + V32)/2 \\ \text{and } V33 + \text{OFFSET} < (V35 + V34)/2 \\ \text{and } V33 + \text{OFFSET} < (V51 + V42)/2 \\ \text{and } V33 + \text{OFFSET} < (V53 + V43)/2 \\ \text{and } V33 + \text{OFFSET} < (V55 + V44)/2 \quad (4)$$

Here, "OFFSET" is a predetermined constant.

Figure 17:
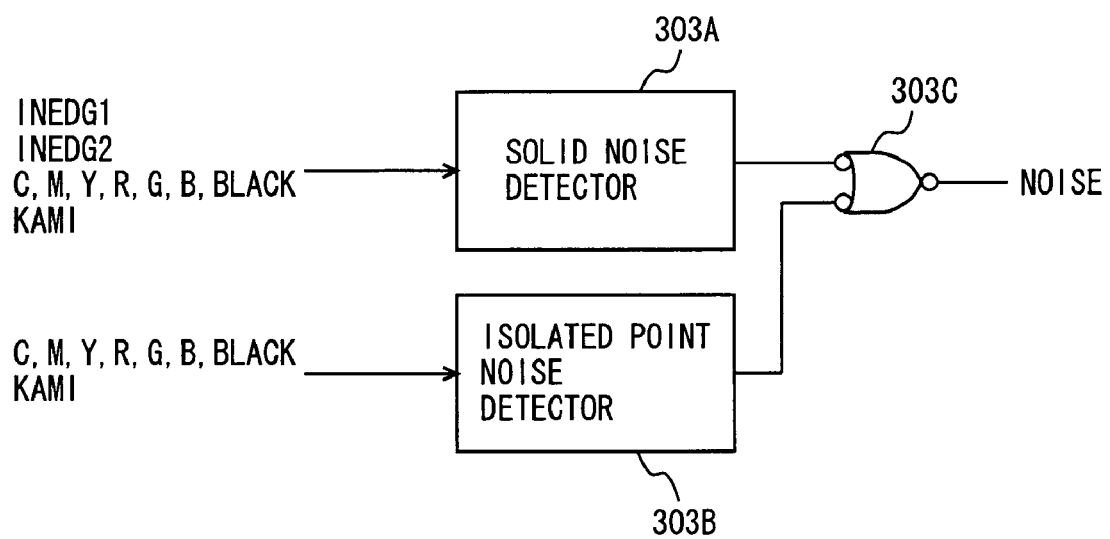
FIG. 17 is a block diagram showing in detail a configuration of a noise signal generator.

FIG. 17 is a block diagram showing in detail a configuration of the noise signal generator. With reference to FIG. 17, noise signal generator 303 includes a solid noise detector 303A, an isolated point noise detector 303B and a logical OR circuit 303C.

Solid noise detector 303A receives color signals C, M, Y, R, G, B, black signal BLACK, first internal edge signal INEDG1, second internal edge signal INEDG2, and black isolated point signal KAMI. Here, color signals C, M, Y, R, G, B, black signal BLACK, first internal edge signal INEDG1, second internal edge signal INEDG2, and black isolated point signal KAMI are generally referred to as determination signals. Solid noise detector 303A determines that pixels at the same position in the main scanning direction and adjacent to each other in the sub scanning direction are solid noise when the color of these pixels adjacent to each other changes in a predetermined order. Specifically, solid noise detector 303A processes four pixels that are at the same position in the main scanning direction and adjacent to each other in the sub scanning direction. Solid noise detector 303A compares determination signals of each pixel to be processed with a lookup table prepared in advance. If the combination of the determination signals matches a combination of determination signals defined in the lookup table, solid noise detector 303A determines that the pixels to be processed are all solid noise to output a solid noise signal. The solid noise signal is "0" when the pixels are determined as solid noise and is "1" when the pixels are not solid noise.

The noise is detected by solid noise detector 303A under the conditions that the original and platen 205 are moved in the same direction and the dust adhering on the original has such a size that can be read simultaneously by at least two of line sensors 213R, 213G and 213B.

Isolated point noise detector 303B receives color signals C, M, Y, R, G, B, black signal BLACK and black isolated point signal KAMI. Isolated point noise detector 303B determines that an isolated point of a predetermined color as isolated point noise. Specifically, isolated point noise detector 303B compares determination signals of pixels to be processed each with a lookup table prepared in advance. When the combination of the determination signals matches a combination of determination signals defined in the lookup table, isolated point noise detector 303B determines that the pixel to be processed is isolated point noise to output an isolated point noise signal. The isolated point noise signal is "0" when the pixel is determined as isolated point noise and is "1" when the pixel is not isolated point noise.

The noise is detected by isolated point noise detector 303B under the conditions that the original and platen 205 are moved in respective directions opposite to each other or moved in the same direction and the noise adhering on the platen has such a size that can be read by one of line sensors 213R, 213G and 213B.

Logical OR circuit 303C receives respective inverted outputs of solid noise detector 303A and isolated point noise detector 303B. Logical OR circuit 303C outputs, as noise signal NOISE, an inverted signal of the logical OR of the signals it receives. Therefore, noise signal NOISE is "0" when solid noise detector 303A determines that pixels are solid noise or isolated point noise detector 303B determines that the pixel is isolated point noise, and is "1" otherwise.

Figure 18:
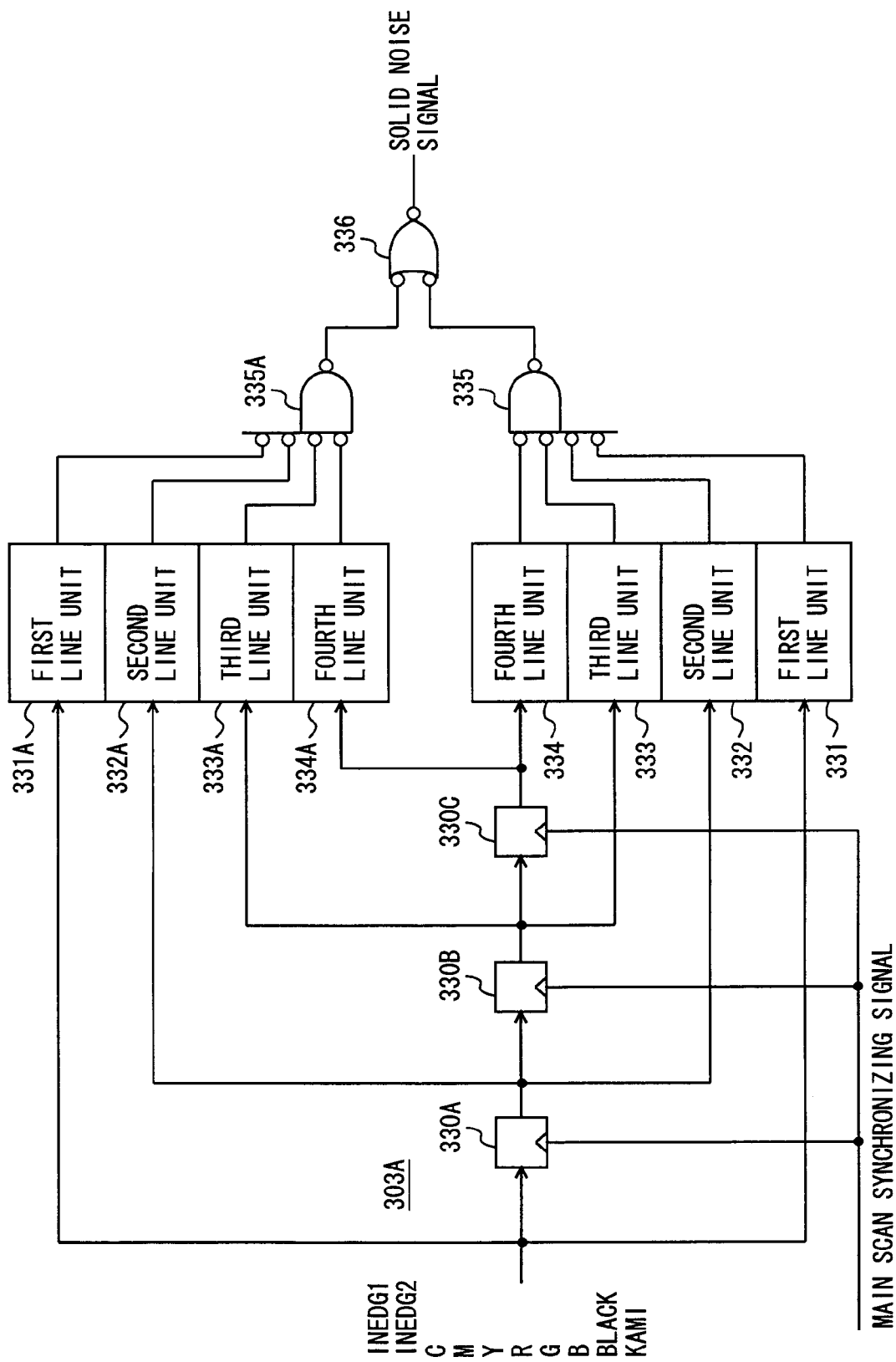
FIG. 18 is a block diagram showing in detail a configuration of a solid noise detector.

FIG. 18 is a block diagram showing in detail a configuration of the solid noise detector. Solid noise detector 303A includes line buffers 330A, 330B, 330C, first line units 331, 331A, second line units 332, 332A, third line units 333, 333A, fourth line units 334, 334A, logical AND circuits 335, 335A, and a logical OR circuit 336.

Line buffers 330A, 330B, 330C receive color signals C, M, Y, R, G, B, black signal BLACK, first internal edge signal INEDG1, second internal edge signal INEDG2, and black isolated point signal KAMI line by line successively. Thus, in line buffer 330B, determination signals for a line subsequent to determination signals for a line stored in line buffer 330C are stored and, in line buffer 330A, determination signals for a line subsequent to the determination signals for a line stored in line buffer 330B are stored.

Line buffers 330A, 330B, 330C receive a main scan synchronizing signal. In response to the input of the main scan synchronizing signal, line buffers 330A, 330B, 330C output determination signals for one pixel. Accordingly, to first line units 331, 331A, second line units 332, 332A, third line units 333, 333A, and fourth line units 334, 334A, determination signals for pixels that are at the same position in the main scanning direction and adjacent to each other in the sub scanning direction are input.

To second line units 332, 332A, determination signals for a pixel of a line subsequent to determination signals for a pixel of a line that are input to first line units 331, 331A are input. To third line units 333, 333A, determination signals for a pixel of a line subsequent to the determination signals for a pixel of a line that are input to second line units 332, 332A are input. To fourth line units 334, 334A, determination signals for a pixel of a line subsequent to the determination signals for a pixel of a line that are input to third line units 333, 333A are input.

According to the input determination signals, first line units 331, 331A, second line units 332, 332A, third line units 333, 333A, and fourth line units 334, 334A determine the attribute and color of a pixel. The attribute of a pixel includes background, first internal edge, second internal edge and solid. The determination signals include determination signals for determining the attribute of a pixel and determination signals for determining the color thereof.

The attribute of a pixel is determined from first internal edge signal INEDG1, second internal edge signal INEDG2 and black isolated point signal KAMI. Pixels included in a region with the attribute of background are non-black isolated point pixels, not first internal edge pixels and second internal edge pixels. Thus, when first internal edge signal INEDG1 and second internal edge signal INEDG2 are "1" and black isolated point signal KAMI is "0" for a pixel, it is determined that the pixel has the attribute of background.

Pixels included in a region with the attribute of first internal edge are first internal edge pixels, second internal edge pixels and non-black isolated point pixels. Thus, when first internal edge signal INEDG1, second internal edge signal INEDG2 and black isolated point signal KAMI are "0" for a pixel, it is determined that the pixel has the attribute of first internal edge.

Pixels included in a region with the attribute of second internal edge are not first internal edge pixels but are second internal edge pixels and non-black isolated point pixels. Thus, when first internal edge signal INEDG1 is "1" and second internal edge signal INEDG2 and black isolated point signal BLACK are "0" for a pixel, it is determined that the pixel has the attribute of second internal edge.

Pixels included in a solid region are not first internal edge pixels and second internal edge pixels but are non-black isolated point pixels. Thus, when first internal edge signal INEDG1 and second internal edge signal INEDG2 are "1" and black isolated point signal KAMI is "0" for a pixel, it is determined that the pixel has the attribute of solid.

Determination signals for determining the color are color signals C, M, Y, R, G, B and black signal BLACK. When one of color signals C, M, Y, R. G, B and black signal BLACK for a pixel is "0", it is determined that the color of the pixel is the color of the signal of "0". For example, when color signal C is "0" and remaining color signals M, Y, R, G, B and black signal BLACK are "1" for a pixel, it is determined that the color of the pixel is cyan (C).

First line unit 331 detects that the attribute of a pixel to be processed is background, second line unit 332 detects that the attribute of a pixel to be processed is first internal edge, third line unit 333 detects that the attribute of a pixel to be processed is second internal edge, and fourth line unit 334 detects that the attribute of a pixel to be processed is solid.

First line unit 331A detects that the attribute of a pixel to be processed is solid, second line unit 332A detects that the attribute of a pixel to be processed is second internal edge, third line unit 333A detects that the attribute or a pixel to be processed is first internal edge, and fourth line unit 334A detects that the attribute of a pixel to be processed is background.

First, second, third, and fourth line units 331, 332, 333, and 334 each compare input determination signals for a pixel with the lookup table to detect that the attribute and color of the pixel match predetermined attribute and color and output the noise signal for indicating that the pixel is noise to logical AND circuit 335. The noise signal is "0" when the pixel is noise and is "1" when the pixel is not noise.

First, second, third, and fourth line units 331A, 332A, 333A, and 334A each compare input determination signals for a pixel with the lookup table to detect that the attribute and color of the pixel match predetermined attribute and color and output the noise signal for indicating that the pixel is noise to logical AND circuit 335A.

To logical AND circuit 335, the respective noise signals provided from first, second, third, and fourth line units 331, 332, 333, and 334 that are inverted are input. The AND of the input signals is inverted to be output to logical OR circuit 336. Thus, the signal provided to logical OR circuit 336 is "0" when all of the first, second, third, and fourth line units 331, 332, 333, and 334 determine that the pixel is noise and is "1" otherwise.

To logical AND circuit 335A, the respective noise signals provided from first, second, third, and fourth line units 331A, 332A, 334A that are inverted are input. The AND of the input signals is inverted to be output to logical OR circuit 336. Thus, the signal provided to logical OR circuit 336 is "0" when all of the first, second, third, and fourth line units 331A, 332A, 333A, and 334A determine that the pixel is noise and is "1" otherwise.

The signals output respectively from logical AND circuits 335 and 335A are inverted to be input to logical OR circuit 336. The logical OR of the input signals is inverted to be output as the solid noise signal. The solid noise signal is thus "0" when all of the first, second, third, and fourth line units 331, 332, 333, and 334 determine that the pixel is noise or all of the first, second, third, and fourth line units 331A, 332A, 333A, and 334A determine that the pixel is noise, and is "1" otherwise.

In this way, first, second, third, and fourth line units 331, 332, 333, and 334 and first, second, third, and fourth line units 331A, 332A, 333A, and 334A compare input determination signals with the predetermined lookup table to determine whether or not a pixel to be processed is noise.

FIGS. 19 and 19B show exemplary lookup tables stored by the solid noise detector. FIG. 19A shows a lookup table referenced by first, second, third, and fourth line units 331, 332, 333, and 334 and FIG. 19B shows a lookup table referenced by first, second, third, and fourth line units 331A, 332A, 333A, and 334A. The lookup tables include determination signals for determining in which of respective regions of background, first internal edge, second internal edge and solid black a pixel to be processed is included as well as determination signals for determining the color of the pixel.

First line unit 331 detects that the attribute of a pixel is background. First line unit 331 thus detects that first internal edge signal INEDG1 and second internal edge signal INEDG2 are "1" and black isolated point signal KAMI is "0". Second line unit 332 detects that the attribute of a pixel is first internal edge. Second line unit 331 thus detects that first internal edge signal INEDG1, second internal edge signal INEDG2 and black isolated point signal KAMI are "0". Third line unit 333 detects that the attribute of a pixel is second internal edge. Third line unit 333 thus detects that first internal edge signal INEDG1 is "1" and second internal edge signal INEDG2 and black isolated point signal KAMI are "0". Fourth line unit 334 detects that the attribute of a pixel is solid. Fourth line unit 334 thus detects that first internal edge signal INEDG1 and second internal edge signal INEDG2 are "1" and black isolated point signal KAMI is "0".

First line unit 331A detects that the attribute of a pixel is solid. First line unit 331A thus detects that first internal edge signal INEDG1 and second internal edge signal INEDG2 are "1" and black isolated point signal KAMI is "0". Second line unit 332A detects that the attribute of a pixel is second internal edge. Second line unit 332A thus detects that first internal edge signal INEDG1 is "1" and second internal edge signal INEDG2 and black isolated point signal KAMI are "0". Third line unit 333A detects that the attribute of a pixel is first internal edge. Third line unit 333A thus detects that first internal edge signal INEDG1, second internal edge signal INEDG2 and black isolated point signal KAMI are "0". Fourth line unit 334A detects that the attribute of a pixel is solid. Fourth line unit 334A thus detects that first internal edge signal INEDG1 and second internal edge signal INEDG2 are "1" and black isolated point signal KAMI is "0".

As discussed above, when pixels that are at the same position in the main scanning direction and successive in the sub scanning direction are noise pixels, the color changes in a predetermined order. Here, it is supposed that the original and platen 205 are moved in the same direction and platen 205 is moved at a higher rate than that of the original. When an original of white in color is read while black dust adheres on platen 205, the color changes in the order of white (W), yellow (Y), red (R), black (K), blue (B), cyan (C), and white (W). The preceding change in color, WYRK, is detected by first line unit 331, second line unit 332, third line unit 333, and fourth line unit 334. The following change in color, KBCW, is detected by first line unit 331A, second line unit 332A, third line unit 333A, and fourth line unit 334A.

First line unit 331 detects that all of color signals C, M, Y, R, G, B and black signal BLACK for a pixel to be processed is "1". Second line unit 332 detects that all of color signals C, M, R, G, B and black signal BLACK for a pixel to be processed is "1" and color signal Y therefor is "0". Third line unit 333 detects that all of color signals C, M, Y, G, B and black signal BLACK for a pixel to be processed is "1" and color signal R therefor is "0". Fourth line unit 334 detects all of color signals C, M, Y, R, G, B for a pixel to be processed is "1" and black signal BLACK therefor is "0".

First line unit 331A detects color signals C, M, Y, R, G, B for a pixel to be processed is "1" and black signal BLACK therefor is "0". Second line unit 332A detects color signals C, M, Y, R, G and black signal BLACK for a pixel to be processed is "1" and color signal B therefor is "0". Third line unit 333A detects that all of color signals M, Y, R, G, B and black signal BLACK for a pixel to be processed is "1" and color signal C therefor is "0". Fourth line unit 334A detects that all of color signals C, M, Y, R, G, B and black signal BLACK for a pixel to be processed are "1".

The combination of the color signals and black signal in the lookup table varies depending on respective directions and rates in and at which the original and platen 205 are moved, the color of the original, the color of dust, and the length of the dust. Accordingly, a plurality of lookup tables are prepared according to respective directions and rates in and at which the original and platen 205 are moved, the color of the original, the color of dust, and the length of the dust.

The combination of the color signals and black signal is now described. For convenience of description, colors are represented by cyan (C), magenta (M), yellow (Y), red (R), green (G), blue (B), white (W), and black (K). Further, it is supposed that the original and platen 205 are moved in the same direction.

(1) It is supposed that the platen is moved faster (e.g. 4/3 times) than the original and the size of dust is at least a predetermined number of lines (e.g. four lines at the rate of 4/3 times).

(1-1) Then, on the condition that the original is white and the dust is black in color, the color changes in the order WYRKBCW. In this case, the lookup tables shown in FIGS. 19A and 19B are used. As the size of the dust is larger, the number of K pixels successive in the above-indicated color change pattern increases. Further, as the rate of the platen increases, the number of pixels of such single colors as Y, R, B and C preceding and following the K pixel increases.

(1-2) Then, on the condition that the original is black and the dust is white in color, the color changes in the order KBCWYRK. As the size of the dust is larger, the number of W pixels successive in the above-indicated color change pattern increases.

(2) It is supposed that the platen is moved faster than the original while the size of dust is smaller than a predetermined number of lines. Then, noise is generated as an isolated point of a single color. The color isolated point can be detected to detect the noise. Note that the isolated point could be one of successive isolated points of different colors.

(3) It is supposed that the platen is moved slower than the original while the size of dust is at least two lines.

(3-1) Then, on the condition that the original is white and the dust is black in color, the color changes in the order WCBKRYW. As the size of the dust is larger, the number of K pixels successive in the above-indicated color change pattern increases. Further, as the rate of the platen decreases, the number of pixels of such single colors as C, B, R and Y preceding and following the K pixel increases.

(3-2) Then, on the condition that the original is black and the dust is white in color, the color changes in the order KRYWCBK. As the size of the dust is larger, the number of W pixels successive in the above-indicated color change pattern increases.

(4) It is supposed that the platen is moved slower than the original and the size of dust is smaller than two lines. Then, noise is generated as an isolated point of a single color or a group of successive pixels of a single color. The isolated point or the group of pixels can be detected to detect the noise.

FIG. 20 shows an exemplary lookup table referenced by isolated point noise detector 303B. With reference to FIG. 20, noise of an isolated point of cyan (C) is detected from the combination of color signals M, Y, R, G, B, black signal BLACK and black isolated point signal KAMI of "1" and color signal C of "0". Noise of an isolated point of magenta (M) is detected from the combination of color signals C, Y, R, G, B, black signal BLACK and black isolated point signal KAMI of "1" and color signal M of "0". Noise of an isolated point of yellow (Y) is detected from the combination of color signals C, M, R, G, B, black signal BLACK and black isolated point signal KAMI of "1" and color signal Y of "0". Noise of an isolated point of red (R) is detected from the combination of color signals C, M, Y, G, B, black signal BLACK and black isolated point signal KAMI of "1" and color signal R of "0". Noise of an isolated point of green (G) is detected from the combination of color signals C, M, Y, R, B, black signal BLACK and black isolated point signal KAMI of "1" and color signal G of "0". Noise of an isolated point of blue (B) is detected from the combination of color signals C, M, Y, R, G, black signal BLACK and black isolated point signal KAMI of "1" and color signal B of "0".

Figure 21:
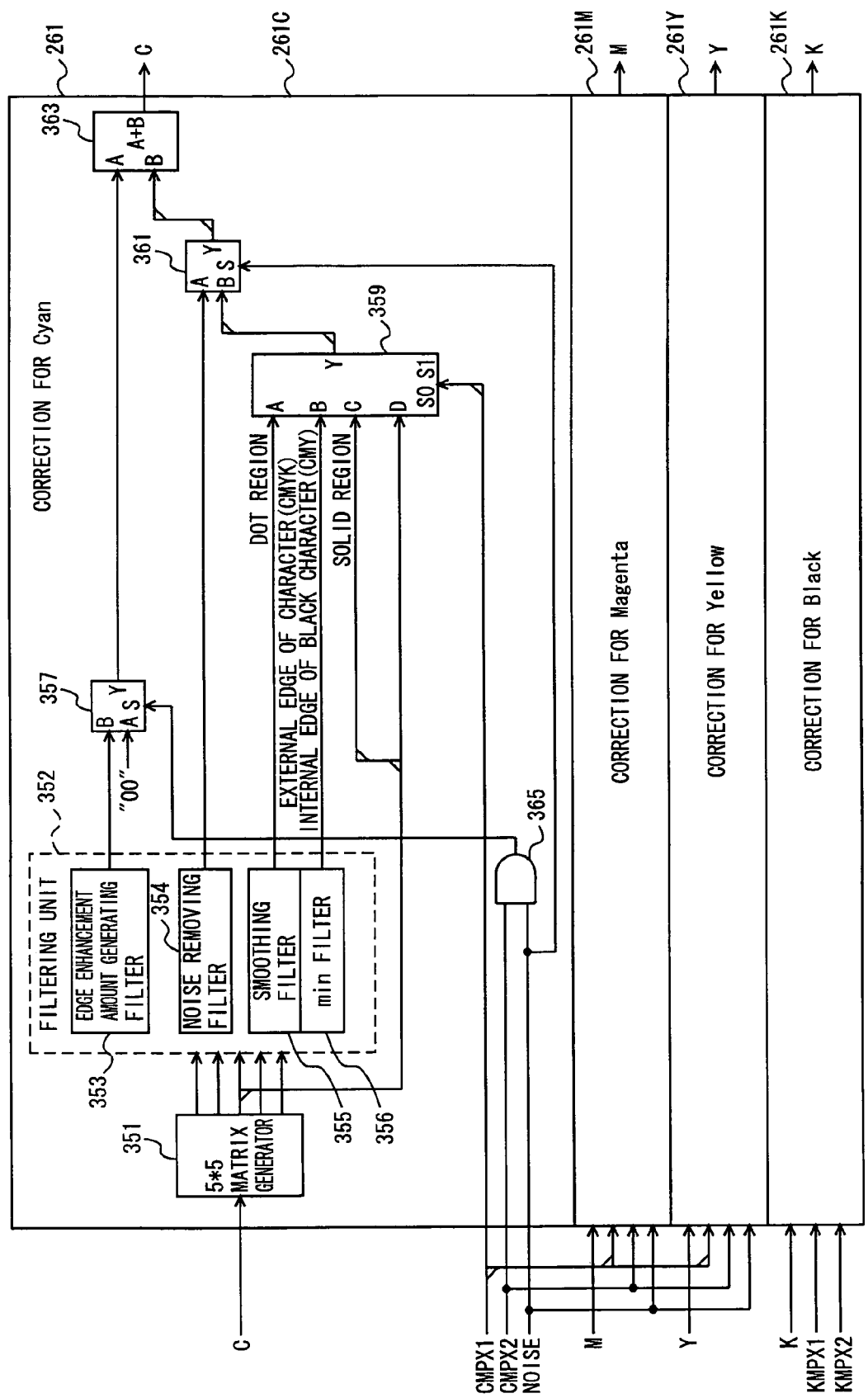
FIG. 21 is a block diagram showing a configuration of an MTF corrector.

FIG. 21 is a block diagram showing a configuration of the MTF corrector. With reference to FIG. 21, MTF corrector 261 includes, for respective pixel signals C, M, Y, and K, a cyan MTF corrector 261C, a magenta MTF corrector 261M, a yellow MTF corrector 261Y, and a black MTF corrector 261K. These correctors are different only in color to be processed and are identical in processing to be carried out. Therefore, cyan MTF corrector 261C is representatively described below.

Cyan MTF corrector 261C receives pixel data C, edge signal CMPX2 for indicating that a pixel to be processed is an edge pixel, attribute signal CMPX1 indicating the attribute of the pixel, and noise signal NOISE.

Cyan MTF corrector 261C includes a 5*5 matrix generator 351 for generating a matrix of five by five pixels, a filtering unit 352, selectors 357, 359, 361, a logical AND circuit 365, and an adder 363.

Filtering unit 352 includes an edge enhancement amount generating filter 353, a noise removing filter 354, a smoothing filter 355, and a minimum value filter 356. Filtering unit 352 receives matrix data from 5*5 matrix generator 351. Filtering unit 352 uses edge enhancement amount generating filter 353 to perform an operation on the matrix data and output the result of the operation, namely an amount of edge enhancement, to selector 357. Filtering unit 352 uses noise removing filter 354 to perform an operation on the matrix data and output the result of the operation to selector 361. Filtering unit 352 uses smoothing filter 355 to perform an operation on the matrix data and output the result of the operation to selector 359. Filtering unit 352 uses minimum value filter 356 to perform an operation on the matrix data and output the result of the operation to selector 359.

FIG. 22 shows an exemplary noise removing filter. With reference to FIG. 22, the noise removing filter has respective weighting factors for five pixels arranged in the main scanning direction. The weighting factor shown at the center is for a pixel to be processed. With the noise removing filter shown in FIG. 22, the value of the pixel to be processed is interpolated using respective values of four pixels adjacent to each other in the main scanning direction. The value of the pixel to be processed is determined by dividing by four the sum of respective pixel values of pixels directly adjacent to the pixel to be processed and respective pixel values that are doubled of pixels adjacent thereto each with one pixel therebetween in the main scanning direction.

With reference again to FIG. 21, to logical AND circuit 365, edge signal CMPX2 for indicating that a pixel to be processed is an edge pixel and noise signal NOISE are input. Logical AND circuit 365 outputs, as a selection signal, the logical AND of the input signals to a selection signal input terminal of selector 357. The selection signal that is output from logical AND circuit 365 is "1" when the pixel to be processed is not a noise pixel but edge and is "0" otherwise. When signal "1" is input to the selection signal input terminal, selector 357 outputs to adder 363 the amount of edge enhancement provided from filtering unit 352. When edge signal "0" is input to the selection signal input terminal, selector 357 outputs to adder 363 an amount of edge enhancement of "00".

To a selection signal input terminal of selector 359, attribute signal CMPX1 is input. When attribute signal CMPX1 is "0", selector 359 selects a smoothed value provided from filtering unit 352 and outputs the selected value to selector 361. When attribute signal CMPX1 is "0", the pixel to be processed is present in a dot region and accordingly the pixel to be processed in the dot region is smoothed.

When attribute signal CMPX1 is "1", selector 359 selects a minimum-filtered value provided from filtering unit 352 and outputs the selected value to selector 361. When attribute signal CMPX1 is "1", the pixel to be processed is present in a region of external edge or internal edge of a black character and accordingly the pixel in the external edge or internal edge of a black character is replaced with the minimum value of neighboring pixels.

When attribute signal CMPX1 is "2" or "3", selector 359 selects signal C provided from 5*5 matrix generator 351 to output the selected one to selector 361.

Selector 361 receives noise signal NOISE. When noise signal NOISE is "0" indicating that the pixel to be processed is noise, selector 361 selects and outputs to adder 363 signal C provided from filtering unit 352 with noise removed therefrom. When noise signal NOISE is "1" indicating that the pixel is not noise, selector 361 selects and outputs to adder 363 signal C provided from selector 359 that has been corrected or uncorrected.

Adder 363 calculates and outputs the sum of signal C from selector 361 and the amount of edge enhancement from selector 357.

Accordingly, when a pixel to be processed is a noise pixel, signal C has its value determined through noise-removing filtering by filtering unit 352. In this case, no edge enhancement and no correction appropriate for the attribute are carried out. Further, when a pixel to be processed is not a noise pixel but an edge pixel, the edge pixel is edge-enhanced and corrected according to the attribute thereof In this case, no noise removal is performed.

In the present embodiment, although solid noise detector 303A detects the attribute as well as the change in color of four pixels located at the same position in the main scanning direction and successive in the sub scanning direction, it may detect a change in color of at least five pixels under the condition that at least five pixels are located at the same position in the main scanning direction ad successive in the sub scanning direction. In this case, the size of the first and second internal edge determination filters and the isolated point detection filter may be changed. As the number of successive pixels increases, pixels of the same color are successively detected. However, the order of change in color remains the same.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
a plurality of line sensors mutually spaced in a sub scanning direction to scan an original in the sub scanning direction, the plurality of line sensors generating a corresponding plurality of output signals based on the scanning of the original;
a platen arranged between a movement pathway of the original and said plurality of line sensors;
a mover moving said platen at a rate relative to said plurality of line sensors, said rate being different from a movement rate of the original relative to said plurality of line sensors;
an interline corrector synchronizing the plurality of output signals with each other to obtain a composite output corresponding to a single location on the original but different locations on the platen; and
a noise detector receiving the composite output and detecting an isolated point of a chromatic color in the composite output corresponding to contamination on the platen.

2. The image reading apparatus according to claim 1, wherein said noise detector further includes an isolated point extractor extracting a pixel different in lightness from neighboring pixels as the isolated point.

3. The image reading apparatus according to claim 1, wherein said noise detector further includes a region noise determiner determining that pixels changing in color in a predetermined order in the sub scanning direction are noise pixels.

4. The image reading apparatus according to claim 3, further comprising a transporter transporting the original, wherein
said predetermined order is determined based on the rate at which said platen is moved and the rate at which said original is transported.

5. The image reading apparatus according to claim 4, wherein
said predetermined order is further determined based on the size of dust adhering on the platen.

6. The image reading apparatus according to claim 1, further comprising a corrector correcting the detected noise pixel using values of neighboring pixels.

7. The image reading apparatus according to claim 1, wherein said noise detector further includes
an edge detector detecting an edge pixel, and
an edge noise determiner determining that said detected edge pixel is a noise pixel on conditions that said detected edge pixel is adjacent in the sub scanning direction to a pixel of an achromatic color and said detected edge pixel has a predetermined chromatic color.

8. An image reading apparatus comprising:
a plurality of line sensors mutually spaced in a sub scanning direction to scan an original in the sub scanning direction, the plurality of line sensors generating a corresponding plurality of output signals based on the scanning of the original;

a platen arranged between a movement pathway of the original and said plurality of line sensors;

a mover moving said platen at a rate relative to said plurality of line sensors, said rate being different from a movement rate of the original relative to said plurality of line sensors;

an interline corrector synchronizing the plurality of output signals with each other to obtain a composite output corresponding to a single location on the original, but different locations on the platen; and a noise detector receiving the composite output and detecting a noise region when a pattern of color changes in the composite output matches a predetermined noise pattern related to the relative movement rates of the platen and the original.

9. The image reading apparatus according to claim 8, further comprising a transporter transporting the original, wherein said predetermined noise pattern is determined based on the rate at which said platen is moved and the rate at which said original is transported.

10. The image reading apparatus according to claim 9, wherein said predetermined noise pattern is further determined based on the size of dust adhering on the platen.

11. The image reading apparatus according to claim 8, further comprising a corrector correcting the pixel determined as the noise pixel by said noise detector using values of neighboring pixels.

* * * * *